US009284197B2

(12) United States Patent
Suemura et al.

(10) Patent No.: US 9,284,197 B2
(45) Date of Patent: Mar. 15, 2016

(54) COLLOIDAL SILICA PARTICLES, PROCESS FOR PRODUCING THE SAME, AND ORGANIC SOLVENT-DISPERSED SILICA SOL, POLYMERIZABLE COMPOUND-DISPERSED SILICA SOL, AND DICARBOXYLIC ANHYDRIDE-DISPERSED SILICA SOL EACH OBTAINED FROM THE SAME

(75) Inventors: Naohiko Suemura, Sodegaura (JP); Keiko Yoshitake, Sodegaura (JP); Toshiaki Takeyama, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 821 days.

(21) Appl. No.: 12/867,289

(22) PCT Filed: Feb. 12, 2009

(86) PCT No.: PCT/JP2009/052303
§ 371 (c)(1),
(2), (4) Date: Aug. 12, 2010

(87) PCT Pub. No.: WO2009/101974
PCT Pub. Date: Aug. 20, 2009

(65) Prior Publication Data
US 2010/0311871 A1  Dec. 9, 2010

(30) Foreign Application Priority Data
Feb. 12, 2008 (JP) ................................. 2008-031176

(51) Int. Cl.
*C01B 33/145* (2006.01)
*C01B 33/14* (2006.01)
*B82Y 30/00* (2011.01)

(52) U.S. Cl.
CPC .................. *C01B 33/14* (2013.01); *B82Y 30/00* (2013.01); *C01B 33/145* (2013.01); *C01P 2004/64* (2013.01)

(58) Field of Classification Search
CPC ............................. C08L 63/00; C01B 33/145
USPC ....................................................... 523/422
See application file for complete search history.

(56) References Cited

U.S. PATENT DOCUMENTS

| 3,342,747 A | 9/1967 | Mindick et al. |
| 4,772,660 A | 9/1988 | Kitamura et al. |
| 5,010,207 A | 4/1991 | Park |
| 5,902,226 A | 5/1999 | Tasaki et al. |
| 6,291,535 B1 | 9/2001 | Watanabe et al. |
| 6,677,389 B2 | 1/2004 | Fukuda et al. |
| 6,680,040 B1 | 1/2004 | Nishida et al. |
| 6,713,170 B1 | 3/2004 | Kaneko et al. |
| 7,863,215 B2 * | 1/2011 | Miyazoe ................. B01J 21/08 106/287.34 |
| 2004/0101822 A1 * | 5/2004 | Wiesner ................. B82Y 30/00 435/5 |
| 2007/0032560 A1 | 2/2007 | Suemura et al. |

FOREIGN PATENT DOCUMENTS

| CN | 1849373 A | 10/2006 |
| EP | 0 220 026 A2 | 4/1987 |
| EP | 1 188 716 A1 | 3/2002 |
| JP | A-59-8614 | 1/1984 |
| JP | A-62-95130 | 5/1987 |
| JP | A-63-123807 | 5/1988 |
| JP | A-2-167813 | 6/1990 |
| JP | A-7-10522 | 1/1995 |
| JP | A-2000-169133 | 6/2000 |
| JP | A-2002-302617 | 10/2002 |
| JP | A-2007-63117 | 3/2007 |
| JP | A-2007-217228 | 8/2007 |
| WO | WO00/34396 | 6/2000 |
| WO | WO 00/37359 A1 | 6/2000 |
| WO | WO 2005/019195 A2 | 3/2005 |

OTHER PUBLICATIONS

Zhuravlev, The Chemistry of Silica: Solubility, Polymerization, Colloid and Surface Properties, and Biochemistry, Wiley-Interscience, New York, p. 636(1979).*
International Search Report dated Mar. 17, 2009 in International Patent Application No. PCT/JP2009/052303 (with translation).
Nov. 5, 2012 Office Action issued in Chinese Patent Application No. 200980104988.3 (with translation).
Extended European Search Report issued in European Patent Application No. 09710977.1 dated Jun. 27, 2012.

* cited by examiner

*Primary Examiner* — Megan McCulley
(74) *Attorney, Agent, or Firm* — Oliff PLC

(57) ABSTRACT

There is provided colloidal silica particles comprising at least one polyvalent metal element M selected from a group consisting of iron, aluminum, zinc, zirconium, titanium, tin, and lead in an average content of 0.001 to 0.02 in terms of an M/Si molar ratio, and having an average primary particle diameter of 5 to 40 nm, wherein the content of the polyvalent metal element M present in an outermost layer of the colloidal particles is 0 to 0.003 atom per square nanometer ($nm^2$) of a surface area of the colloidal particles; and a silica sol that the colloidal silica particles are dispersed in an organic solvent, a silica sol that the colloidal silica particles are dispersed in a polymerizable compound, and a silica sol that the colloidal silica particles are dispersed in a dicarboxylic anhydride.

2 Claims, No Drawings

US 9,284,197 B2

COLLOIDAL SILICA PARTICLES, PROCESS FOR PRODUCING THE SAME, AND ORGANIC SOLVENT-DISPERSED SILICA SOL, POLYMERIZABLE COMPOUND-DISPERSED SILICA SOL, AND DICARBOXYLIC ANHYDRIDE-DISPERSED SILICA SOL EACH OBTAINED FROM THE SAME

TECHNICAL FIELD

The present invention relates to colloidal silica particles, a process for producing the colloidal silica particles, and an organic solvent-dispersed silica sol, a polymerizable compound-dispersed silica sol, and a dicarboxylic anhydride-dispersed silica sol each obtained from the colloidal silica particles.

BACKGROUND ART

A silica sol in which colloidal silica particles having a particle diameter of about several to 100 nm are dispersed in a liquid has high transparency. Furthermore, due to their high hardness, the colloidal silica particles are mixed into resins and the like to be used as a reforming agent for, for example, providing hardness or heat resistance to the resin. When the colloidal silica particles are mixed with a resin or the like, an aqueous silica sol may be used. However, a sol in which colloidal silica particles are dispersed in an organic compound, such as an organic solvent-dispersed silica sol and a polymerizable compound-dispersed silica sol that is to be the resin raw material, is often used in consideration of its compatibility or its reactivity with the resin or the like.

As an example of the organic solvent-dispersed silica sol, Patent Document 1 discloses a process for producing an organic solvent-dispersed silica sol in which an aqueous silica sol and an organic solvent are mixed and then the mixture is dehydrated with an ultrafiltration membrane. Furthermore, Patent Document 2 discloses a process for producing a silica sol in methanol in which metal ions contained in an aqueous silica sol are removed by ion exchange, next, an organic base is added, subsequently, methanol is mixed, and then the mixture is concentrated and dehydrated by an ultrafiltration method. Patent Document 3 discloses an organic solvent-dispersed silica sol in which an alkaline earth metal ion is bonded on the surface of colloidal silica particles. Furthermore, as the polymerizable compound-dispersed silica sol, Patent Document 4 discloses an oxide sol that includes 80 mol % or more of a reactive monomer having a polymerizable unsaturated bond in the molecule on the basis of the dispersion medium.

When the organic solvent-dispersed silica sol is prepared from an aqueous silica sol as the raw material, alkali metal ions such as Na ions contained in the aqueous silica sol are previously removed by cation exchange to make an acidic aqueous silica sol. The alkaline aqueous silica sol containing the alkali metal ions has poor compatibility with many organic solvents such as alcohols and ethers and thus the mixing with such organic solvents causes the aggregation or the gelation of the colloidal silica particles.

It is known that the acidic aqueous silica sol obtained according to the above process has the characteristics that the alkali metal ions present in the colloidal silica particles are eluted with time to increase the pH, and thus the viscosity of the silica sol increases and finally the gelation occurs. Therefore, disclosed is a process for stabilizing an acidic aqueous silica sol in which an alkaline aqueous silica sol is cation-exchanged, then the obtained sol is aged without treatment or in the presence of a small amount of an acid to diffuse the alkali metal ions in the colloidal silica particles into the colloid dispersion medium, and then the alkali metal ions are further removed by cation-exchange (Patent Document 5). Furthermore, disclosed is a process for producing a stable acidic aqueous silica sol in which an aluminum compound is present in the particle growth step of the colloidal silica particles to contain the aluminum compound in the colloidal silica particles, and thus the aluminum compound can trap the alkali metal ions present in the colloidal silica particles (Patent Document 6).

Patent Document 1: Japanese Patent Application Publication No. JP-A-59-8614
Patent Document 2: Japanese Patent Application Publication No. JP-A-2-167813
Patent Document 3: Japanese Patent Application Publication No. JP-A-2007-63117
Patent Document 4: Japanese Patent Application Publication No. JP-A-62-95130
Patent Document 5: U.S. Pat. No. 3,342,747 specification
Patent Document 6: Japanese Patent Application Publication No. JP-A-63-123807

DISCLOSURE OF THE INVENTION

Problem to be Solved by the Invention

When the organic solvent-dispersed silica sol is obtained by a solvent replacement method, it is desirable that the concentration of silica in the acidic aqueous silica sol to be the raw material is as high as possible for improving the substitution efficiency of the organic solvent. The acidic aqueous silica sol has insufficient stability comparing with the alkaline silica sol. The acidic aqueous silica sol having an average primary particle diameter of about 5 to 40 nm produced by the process disclosed in Patent Document 5 has poor electrostatic repulsion between the colloidal silica particles. Thus, when the silica concentration increases, the viscosity increase and the gelation may occur, which is inefficient.

Furthermore, in the acidic aqueous silica sol produced by the process disclosed in Patent Document 6, the electrostatic repulsion between the colloidal silica particles increases to readily increase the silica concentration because of the presence of an aluminum compound contained in the colloidal silica particles, but the surface has more solid acid sites comparing with common colloidal silica particles. The catalytic action by a solid acid increases because of the presence of the solid acid sites, and thus, when the organic solvent-dispersed silica sol is prepared, an organic solvent such as ketones, esters, and amides may be decomposed or discolored. Furthermore, when a polymerizable compound-dispersed silica sol is produced using the organic solvent-dispersed silica sol as the raw material, the polymerizable compound is readily decomposed. Moreover, a resin composition that is obtained by the polymerization of the polymerizable compound-dispersed silica sol has disadvantages in which troubles such as decomposition or discoloration and crack formation of the resin readily occur.

The present invention provides colloidal silica particles that do not cause decomposition, discoloration, and the like of an organic compound, which is caused when the prior colloidal silica particles as mentioned above are dispersed in the organic compound, do not cause decomposition, discoloration, and the like of a resin even when the particles are mixed into the resin, and have good dispersion stability to a dispersion medium, a process for producing the colloidal silica particles, and an organic solvent-dispersed silica sol, a polymerizable compound-dispersed silica sol, and a dicarboxylic anhydride-dispersed silica sol each obtained from the colloidal silica particles.

Means for Solving the Problem

The present invention provides: as a first aspect, colloidal silica particles including at least one polyvalent metal element M selected from a group consisting of iron, aluminum, zinc, zirconium, titanium, tin, and lead in an average content of 0.001 to 0.02 in terms of an M/Si molar ratio, and having an average primary particle diameter of 5 to 40 nm, in which the content of the polyvalent metal element M present in an outermost layer of the colloidal particles is 0 to 0.003 atom per square nanometer (nm$^2$) of the surface area of the colloidal particles;

as a second aspect, an organic solvent-dispersed silica sol including the colloidal silica particles as described in the first aspect, in which the colloidal silica particles are dispersed in the organic solvent;

as a third aspect, the organic solvent-dispersed silica sol according to the second aspect, in which the organic solvent is at least one solvent selected from a group consisting of alcohols, ethers, ketones, esters, amides, hydrocarbons, and nitriles;

as a fourth aspect, a polymerizable compound-dispersed silica sol including the colloidal silica particles as described in the first aspect, in which the colloidal silica particles are dispersed in at least one compound selected from a group consisting of a polymerizable compound having an ethylenically unsaturated bond, a polymerizable compound having an epoxy ring, a polymerizable compound having an oxetane ring, and a polymerizable compound having a vinyl ether structure;

as a fifth aspect, the polymerizable compound-dispersed silica sol according to the fourth aspect, in which the polymerizable compound having an epoxy ring is an ester modified epoxy compound containing a compound (i) having a functional group of Formula (1):

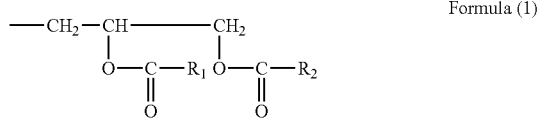

Formula (1)

(where each of $R_1$ and $R_2$ is independently an alkyl group, an alkenyl group, an alkynyl group, an aryl group, an aralkyl group, or a heterocyclic group, or a halogenated, aminated, or nitrated derivative thereof) in the molecule and a compound (ii) having a glycidyl group in the molecule;

as a sixth aspect, the polymerizable compound-dispersed silica sol according to the fifth aspect, in which the compound (i) is a compound in which, among n pieces of glycidyl groups (where n is an integer of 2 to 16) in the molecule, one or more and n pieces or less of the glycidyl group(s) are replaced with the functional group of Formula (1);

as a seventh aspect, the polymerizable compound-dispersed silica sol according to the fifth aspect, in which the compound (ii) is a compound having n pieces of glycidyl groups (where n is an integer of 2 to 16) in the molecule;

as an eighth aspect, the polymerizable compound-dispersed silica sol according to the fifth aspect, in which a molar ratio of the compound (i):the compound (ii) is 1:0.3 to 1.5;

as a ninth aspect, the polymerizable compound-dispersed silica sol according to any one of the fifth aspect, the sixth aspect, and the eighth aspect, in which the compound (i) is a compound in which the glycidyl group in tris-(2,3-epoxypropyl)-isocyanate is replaced with the functional group of Formula (1);

as a tenth aspect, the polymerizable compound-dispersed silica sol according to any one of the fifth aspect, the seventh aspect, and the eighth aspect, in which the compound (ii) is tris-(2,3-epoxypropyl)-isocyanate;

as an eleventh aspect, a dicarboxylic anhydride-dispersed silica sol including the colloidal silica particles as described in the first aspect, in which the colloidal silica particles are dispersed in a dicarboxylic anhydride in a liquid form at 30° C.;

as a twelfth aspect, the dicarboxylic anhydride-dispersed silica sol according to the eleventh aspect, in which the dicarboxylic anhydride contains at least one compound selected from a group consisting of methylhexahydrophthalic anhydride, hydrogenated methylnadic anhydride, and hydrogenated trimellitic anhydride; and as a thirteenth aspect, a process for producing the colloidal silica particles according to the first aspect, the process including (I) and (II):
(I): adding an acid to a silica sol containing colloidal silica particles so that the silica sol has a pH of 0 to 2.0, the colloidal silica particles including at least one polyvalent metal element M selected from a group consisting of iron, aluminum, zinc, zirconium, titanium, tin, and lead in an average content of 0.001 to 0.02 in terms of an M/Si molar ratio, and having an average primary particle diameter of 5 to 40 nm; and aging the sol at 0 to 40° C. for 0.5 to 100 hours; and
(II): contacting the acidic silica sol obtained in (I) with a strongly acidic cation-exchange resin in the hydrogen form at a pH of 0 to 2.0, and further contacting the sol with a strongly basic anion-exchange resin in the hydroxy form.

Effects of the Invention

The colloidal silica particles of the present invention are colloidal silica particles including at least one polyvalent metal element M selected from a group consisting of iron, aluminum, zinc, zirconium, titanium, tin, and lead in an average content of 0.001 to 0.02 in terms of an M/Si molar ratio, and having an average primary particle diameter of 5 to 40 nm, in which the content of the polyvalent metal element M present in an outermost layer of the colloidal particles is 0 to 0.003 atom per square nanometer of the surface area of the colloidal particles. On this account, the colloidal silica particles of the present invention are colloidal silica particles having small action of a solid acid on the surface of the colloidal silica particles and having large electrostatic repulsion. Silica sols in which the colloidal silica particles are stably dispersed in an organic compound such as various organic solvents, polymerizable compounds, and dicarboxylic anhydrides can be obtained. Furthermore, the colloidal silica particles rarely cause decomposition, degradation, discoloration, and the like of such organic compounds even when the particles come in contact with the organic compounds.

In the organic solvent-dispersed silica sol of the present invention, the colloidal silica particles of the present invention are dispersed in an organic solvent such as alcohols, ethers, ketones, esters, amides, hydrocarbons, and nitriles. The silica sol rarely causes decomposition, degradation, discoloration, and the like of the organic solvent and is stable.

In the polymerizable compound-dispersed silica sol of the present invention, the colloidal silica particles of the present invention are dispersed in a polymerizable compound such as a polymerizable compound having an ethylenically unsaturated bond, a polymerizable compound having an epoxy ring, a polymerizable compound having an oxetane ring, and a polymerizable compound having a vinyl ether structure. The silica sol rarely causes decomposition, degradation, discoloration, polymerization, and the like of the polymerizable compound and is stable.

In the dicarboxylic anhydride-dispersed silica sol of the present invention, the colloidal silica particles of the present invention are dispersed in a dicarboxylic anhydride such as methylhexahydrophthalic anhydride, hydrogenated methylnadic anhydride, and hydrogenated trimellitic anhydride. The silica sol rarely causes decomposition, degradation, discoloration, and the like of the dicarboxylic anhydride and is stable.

When the colloidal silica particles of the present invention or the organic solvent-dispersed silica sol, the polymerizable compound-dispersed silica sol, or the dicarboxylic acid-dispersed silica sol each obtained from the colloidal silica particles is used as the reforming agent for resins or the like, the reforming agent does not cause decomposition, discoloration, and the like of the resin and is useful for reforming the resin, for example, providing hardness and providing heat resistance.

In particular, when the colloidal silica particles of the present invention are used, a polymerizable compound-dispersed silica sol having an epoxy ring and a dicarboxylic anhydride-dispersed silica sol can be obtained with high silica concentration. When an epoxy curing composition is prepared using such a sol to make a cured product, silica can be introduced in the cured product with high concentration. Consequently, the epoxy cured product can have significantly improved heat resistance and strength. Moreover, because the colloidal silica particles of the present invention have extremely low action of a solid acid, discoloration of the cured product rarely occurs.

BEST MODES FOR CARRYING OUT THE INVENTION

The colloidal silica particles of the present invention are colloidal silica particles that include at least one polyvalent metal element M selected from a group consisting of iron, aluminum, zinc, zirconium, titanium, tin, and lead in an average content of 0.001 to 0.02 in terms of M/Si molar ratio and that have an average primary particle diameter of 5 to 40 nm. In the colloidal silica particles, the content of the polyvalent metal element M present in an outermost layer of the colloidal particles is 0 to 0.003 atom per square nanometer of the surface area of the colloidal particles. The colloidal silica particles of the present invention are well dispersed in various organic solvents, polymerizable compounds, dicarboxylic anhydrides, and the like. The colloidal silica particles of the present invention are dense colloidal particles and do not substantially include pores.

The average primary particle diameter of the colloidal silica particles of the present invention is calculated according to the equation D-2720/S from the specific surface area S ($m^2/g$) that is determined by the nitrogen adsorption method, where the particle diameter is D (nm). The colloidal silica particles of the present invention have an average primary particle diameter of 5 to 40 nm. When the average primary particle diameter is less than 5 nm, a silica sol in which the colloidal silica particles are dispersed may have insufficient stability, and when the average primary particle diameter is more than 40 nm, a resin film or a cured product using the colloidal silica particles may not have sufficiently high transparency.

The colloidal silica particles of the present invention include at least one polyvalent metal element M selected from a group consisting of iron, aluminum, zinc, zirconium, titanium, tin, and lead in an average content of 0.001 to 0.02 in terms of M/Si molar ratio, and thus have a negative charge larger than that of colloidal silica particles that include the polyvalent metal element M in an average content of less than 0.001 in terms of M/Si molar ratio. Examples of the polyvalent metal element M include iron, aluminum, zinc, zirconium, titanium, tin, and lead. Examples of the method for measuring the charge of colloidal silica particles include the zeta potential measurement. Because the colloidal silica particles of the present invention have a large negative charge, for example, a zeta potential of −15 mV or less at a pH of 3.5, their dispersibility in a sol is good. On this account, even with a high silica concentration such as 30% by mass or more, a stable organic solvent-dispersed silica sol and a stable polymerizable compound-dispersed silica sol can be obtained. Colloidal silica particles having an M/Si molar ratio of less than 0.001 have a zeta potential of about −5 to 0 mV at a pH of 3.5.

Furthermore, the colloidal silica particles of the present invention have low solid acidity on the surface and very small characteristics as the solid acid because the content of the polyvalent metal element M present in the outermost layer of the particles is 0 to 0.003 atom per square nanometer of the surface area of the colloidal silica particles. Accordingly, when the colloidal silica particles of the present invention are dispersed in an organic compound such as various organic solvents, polymerizable compounds, and dicarboxylic anhydrides, decomposition, degradation, discoloration, polymerization, and the like of the organic compound are not caused. Furthermore, in particular, when the colloidal silica particles of the present invention are introduced in an epoxy resin cured product, coloration of the cured product is rarely caused but the cured product can have improved heat resistance and strength.

When the colloidal silica particles include the polyvalent metal element M in an average content of less than 0.001 in terms of M/Si molar ratio, the colloidal silica particles have small charge to reduce the electrostatic repulsion between the silica particles, and thus an organic solvent-dispersed silica sol and a polymerizable compound-dispersed silica sol each having high silica concentration sometimes cannot be obtained. Furthermore, when the colloidal silica particles include the polyvalent metal element M in an average content of more than 0.02 in terms of M/Si molar ratio, even when the content of the polyvalent metal element M present in the outermost layer of the particles is 0 to 0.003 atom per square nanometer of the surface area of the colloidal silica particles, the colloidal silica particles have too strong charge, and thus the discoloration or the polymerization of the organic solvent or the polymerizable compound may be caused, and furthermore, coloration may be caused in a resin cured product such as an epoxy resin.

In the colloidal silica particles of the present invention, the average content of the polyvalent metal element M is calculated as the M/Si molar ratio from the number of moles of the polyvalent metal element M contained in the whole colloidal silica particle, that is, from the center to the outermost layer of the colloidal silica particle, and from the number of moles of Si atom in the whole colloidal silica particle.

The polyvalent metal element M present in the outermost layer of the colloidal silica particles of the present invention is a polyvalent metal element M present in the layer composed of —O—Si—O-M-O— that is formed by the replacement of a part of Si in an —O—Si—O—Si—O— layer present in the outermost face of the colloidal particles with the polyvalent metal element M, and is a positive ion of the polyvalent metal element M adsorbed on the outermost face of the particles.

The content of the polyvalent metal element M in the outermost layer of the colloidal silica particles of the present invention can be analyzed by the following method of metal ion extraction by acid. Because the colloidal silica particles have a specific gravity of 2.2 and silica has a molecular weight of 60, the number of Si atoms present in the outermost layer of the colloidal silica particles is calculated as 7.9 per square nanometer of the surface area of the colloidal silica particles (see THE COLLOID CHEMISTRY OF SILICA AND SILICATES, Chapter 6, Surface Chemistry, p. 242 to p. 247, written by RALPH K. ILER).

When the average content of the polyvalent metal element M in the colloidal silica particles is an M/Si molar ratio and the polyvalent metal element M is present from the center to the outermost layer of the colloidal silica particles, the number of the polyvalent metal elements M present in the outermost layer of the colloidal silica particles is calculated as 7.9×M/Si per square nanometer. The inventors reveal that an aqueous sol containing the colloidal silica particles is adjusted to have a pH of 1.9 with nitric acid and kept at 20 to 25° C. for 4.5 hours, and thus only the polyvalent metal element M in the outermost layer of the colloidal silica particles is cationized. Thus, the polyvalent metal element M present in the outermost layer of the colloidal silica particles is quantitatively determined using the method. Namely, a silica sol adjusted to have a pH of 1.9 with nitric acid is kept under the condition at 20 to 25° C. for 4.5 hours, then centrifugal filtration is carried out, and the content of the polyvalent metal element in the filtrate is measured. The content is divided by the surface area of the colloidal silica particles to determine the content of the polyvalent metal elements M present in the outermost layer per square nanometer of the surface area of the colloidal silica particles. The aqueous silica sol adjusted to have a pH of 1.9 preferably has a silica concentration of 0.1 to 5% by mass. The centrifugal filtration is not specifically limited as far as the filtrate is sufficiently obtained and can be carried out using an ultrafiltration membrane with a molecular weight cut of 5000 to 50000 and at about 1000 to 10000 rpm. The polyvalent metal ion in the filtrate is measured by a common method for analyzing trace metals (for example, inductively-coupled plasma emission spectrometry). The measured value is divided by the surface area of the colloidal silica particles obtained by the nitrogen adsorption method to calculate the content of the polyvalent metal element M present in the outermost layer per square nanometer of the surface area of the colloidal silica particles.

The colloidal silica particles of the present invention may have any shape such as a spherical shape and an almost spherical shape as far as the object of the present invention is achieved.

The organic solvent-dispersed silica sol of the present invention is a dispersion of the colloidal silica particles of the present invention in an organic solvent such as alcohols, ethers, ketones, esters, amides, hydrocarbons, and nitriles. Specific examples of the organic solvent used in the organic solvent-dispersed silica sol of the present invention are shown below.

Examples of the alcohols include methanol, ethanol, 1-propanol, 2-propanol, 1-butanol, isobutyl alcohol, 2-butanol, ethylene glycol, glycerin, propylene glycol, triethylene glycol, polyethylene glycol, benzyl alcohol, 1,5-pentanediol, and diacetone alcohol.

Examples of the ethers include diethyl ether, dibutyl ether, tetrahydrofuran, dioxane, ethylene glycol monomethyl ether, ethylene glycol monopropyl ether, propylene glycol monomethyl ether, propylene glycol monoethyl ether, diethylene glycol monomethyl ether, diethylene glycol monoethyl ether, and diethylene glycol monobutyl ether.

Examples of the ketones include acetone, methyl ethyl ketone, 2-pentanone, 3-pentanone, methyl isobutyl ketone, 2-heptanone, and cyclohexanone.

Examples of the esters include ethyl formate, methyl acetate, ethyl acetate, propyl acetate, butyl acetate, ethylene glycol monoethyl ether acetate, ethylene glycol monobutyl ether acetate, and propylene glycol monomethyl ether acetate.

Examples of the amides include acetamide, N,N-dimethylformamide, N,N-dimethylacetamide, and N-methylpyrrolidone.

Examples of the hydrocarbons include n-hexane, cyclohexane, benzene, toluene, xylene, solvent naphtha, and styrene, and examples of the halogenated hydrocarbons include dichloromethane and trichloroethylene.

Examples of the nitriles include acetonitrile, glutaronitrile, methoxyacetonitrile, propionitrile, and benzonitrile.

Examples of other organic solvents include dimethylsulfoxide.

The organic solvent-dispersed silica sol of the present invention has a silica concentration of 5 to 70% by mass, and preferably 15 to 60% by mass.

In the organic solvent-dispersed silica sol of the present invention, the dispersed colloidal silica particles may have a surface with hydrophobic treatment. Examples of the hydrophobic treatment agent include silazane, siloxane, alkoxysilane, a partial hydrolysate thereof, and a dimeric to pentameric oligomer polymerized therefrom.

Examples of the silazane include hexamethyldisilazane and hexaethyldisilazane.

Examples of the siloxane include hexamethyldisiloxane, 1,3-dibutyltetramethyldisiloxane, 1,3-diphenyltetramethyldisiloxane, 1,3-divinyltetramethyldisiloxane, hexaethyldisiloxane, and 3-glycidoxypropylpentamethyldisiloxane.

Examples of the alkoxysilane include trimethylmethoxysilane, trimethylethoxysilane, trimethylpropoxysilane, phenyldimethylmethoxysilane, chloropropyldimethylmethoxysilane, dimethyldimethoxysilane, methyltrimethoxysilane, tetramethoxysilane, tetraethoxysilane, tetrapropoxysilane, tetrabutoxysilane, ethyltrimethoxysilane, dimethyldiethoxysilane, propyltriethoxysilane, n-butyltrimethoxysilane, n-hexyltrimethoxysilane, n-octyltriethoxysilane, n-octylmethyldiethoxysilane, n-octadecyltrimethoxysilane, phenyltrimethoxysilane, phenylmethyldimethoxysilane, phenethyltrimethoxysilane, dodecyltrimethoxysilane, n-octadecyltriethoxysilane, phenyltrimethoxysilane, diphenyldimethoxysilane, vinyltrimethoxysilane, vinyltriethoxysilane, vinyltris(β-methoxyethoxy)silane, γ-methacryloxypropyltrimethoxysilane, γ-acryloxypropyltrimethoxysilane, γ-(methacryloxypropyl)methyldimethoxysilane, γ-methacryloxypropylmethyldiethoxysilane, γ-methacryloxypropyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl)γ-(aminopropyl)methyldimethoxysilane, N-β(aminoethyl)γ-(aminopropyl)trimethoxysilane, N-β(aminoethyl)γ-(aminopropyl)triethoxysilane, γ-aminopropyltrimethoxysilane, γ-aminopropyltriethoxysilane, N-phenyl-γ-aminopropyltrimethoxysilane, γ-mercaptopropyltrimethoxysilane, 3-isocyanatepropyltriethoxysilane, trifluoropropyltrimethoxysilane, heptadecatrifluoropropyltrimethoxysilane, n-decyltrimethoxysilane, dimethoxydiethoxysilane, bis(triethoxysilyl)ethane, and hexaethoxydisiloxane.

The hydrophobic treatment of the surface of the colloidal silica particles is especially effective on the organic solvent-dispersed silica sol using a hydrophobic organic solvent such as ethers, ketones, esters, and hydrocarbons.

The organic solvent-dispersed silica sol of the present invention is a stable silica sol in which decomposition, degradation, discoloration, and the like of the organic solvent are not caused because the dispersed colloidal silica particles have large negative charge and extremely weak characteristics as the solid acid.

The polymerizable compound-dispersed silica sol of the present invention is a dispersion of the colloidal silica particles of the present invention in a polymerizable compound such as a polymerizable compound having an ethylenically unsaturated bond, a polymerizable compound having an epoxy ring, a polymerizable compound having an oxetane ring, and a polymerizable compound having a vinyl ether structure. Specific examples of the polymerizable compound used in the polymerizable compound-dispersed silica sol of the present invention are shown below.

Examples of the polymerizable compound having an ethylenically unsaturated bond include an unsaturated carboxylic acid compound such as acrylic acid, methacrylic acid, itaconic acid, crotonic acid, maleic acid, and phthalic acid. Further examples thereof include an unsaturated carboxylic acid ester compound and an unsaturated carboxylic amide compound such as a derivative from the unsaturated carboxylic acid compound and an alcohol compound or an amine compound. Examples thereof include an acrylic acid ester compound, a methacrylic acid ester compound, an itaconic acid ester compound, a crotonic acid ester compound, a maleic acid ester compound, a phthalic acid ester compound, an acrylic acid amide compound, a methacrylic acid amide compound, an itaconic acid amide compound, a crotonic acid amide compound, a maleic acid amide compound, and a phthalic acid amide compound. The alcohol compound is not specifically limited, and examples thereof include polyol compounds having, for example, two to six hydroxy groups such as ethylene glycol, triethylene glycol, tetraethylene glycol, tris(2-hydroxylethyl)isocyanuric acid, triethanolamine, and pentaerythritol. The amine compound is not specifically limited, and examples thereof include polyamine compounds having, for example, two to six primary or secondary amino groups such as ethylenediamine, diaminocyclohexane, diaminonaphthalene, 1,4-bis(aminomethyl)cyclohexane, 3,3',4,4'-tetraaminobiphenyl, and tris(2-aminoethyl)amine.

Specific examples of the polymerizable compound having an ethylenically unsaturated bond include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-((meth)acryloxydiethoxy)phenyl]propane, 3-phenoxy-2-propanoyl acrylate, 1,6-bis(3-acryloxy-2-hydroxypropyl)-hexyl ether, trimethylolpropane tri(meth)acrylate, glycerol tri(meth)acrylate, tris-(2-hydroxylethyl)-isocyanuric acid ester(meth)acrylate, pentaerythritol tri(meth)acrylate, pentaerythritol tetra(meth)acrylate, dipentaerythritol tri(meth)acrylate, dipentaerythritol penta(meth)acrylate, dipentaerythritol hexa(meth)acrylate, tripentaerythritol octa(meth)acrylate, tripentaerythritol hepta(meth)acrylate, 2-hydroxypropyl(meth)acrylate, 2-ethylhexyl(meth)acrylate, 2-norbornylmethyl methacrylate, 2-hydroxy-3-phenoxypropyl(meth)acrylate, 2-hydroxyethyl(meth)acrylate, 2,2-dimethylbutyl acrylate, 2-hydroxybutyl(meth)acrylate, n-propyl(meth)acrylate, n-butyl(meth)acrylate, i-butyl(meth)acrylate, t-butyl(meth)acrylate, n-hexyl(meth)acrylate, n-pentyl(meth)acrylate, n-octyl(meth)acrylate, 2-methoxyethyl(meth)acrylate, 2-methoxymethoxyethyl acrylate, 3-pentyl(meth)acrylate, 3-methyl-2-norbornylmethyl methacrylate, 3-methoxybutyl(meth)acrylate, 4-hydroxybutyl(meth)acrylate, 4-methyl-2-propylpentyl acrylate, 5-norbornen-2-ylmethyl methacrylate, i-propyl(meth)acrylate, n-octadecyl(meth)acrylate, n-nonyl(meth)acrylate, sec-butyl(meth)acrylate, t-pentyl(meth)acrylate, ethyl α-hydroxymethylacrylate, butyl α-hydroxymethylacrylate, methyl α-hydroxymethylacrylate, (meth)acrylic acid, n-stearyl acrylate, isooctyl acrylate, isononyl acrylate, isobornyl(meth)acrylate, ethyl (meth)acrylate, ethylcarbitol acrylate, ethoxyethyl(meth)acrylate, ethoxyethoxyethyl(meth)acrylate, ethoxydiethylene glycol acrylate, cyclohexyl(meth)acrylate, cyclohexylmethyl(meth)acrylate, cyclopentyl acrylate, dicyclopentenyloxyethyl acrylate, cetyl acrylate, tetrahydrofurfuryl(meth)acrylate, phenoxyethyl(meth)acrylate, (meth)acryloyloxyethyl hydrogen phthalate, benzyl(meth)acrylate, methyl(meth)acrylate, methoxyethyl(meth)acrylate, methoxyethoxyethyl(meth)acrylate, methoxypolyethylene glycol (meth)acrylate, lauryl(meth)acrylate, 1,3-butanediol di(meth)acrylate, 1,4-butanediol di(meth)acrylate, 1,6-hexanediol di(meth)acrylate, 1,9-nonanediol di(meth)acrylate, allylated cyclohexyl di(meth)acrylate, glycerin di(meth)acrylate, dicyclopentanyl di(meth)acrylate, tricyclodecanedimethanol di(meth)acrylate, trimethylolpropane di(meth)acrylate, neopentyl glycol adipate di(meth)acrylate, neopentyl glycol di(meth)acrylate, neopentyl glycol hydroxypivalic acid ester diacrylate, ethoxylated trimethylolpropane tri(meth)acrylate, glycerinpropoxy tri(meth)acrylate, trimethylolpropane polyethoxy tri(meth)acrylate, propionic acid-modified dipentaerythritol tri(meth)acrylate, ditrimethylolpropane tetra(meth)acrylate, propionic acid-modified dipentaerythritol tetra(meth)acrylate, propoxylated pentaerythritol tetra(meth)acrylate, propionic acid-modified dipentaerythritol penta(meth)acrylate, glycidyl methacrylate, N,N-dimethylacrylamide, N,N-diethylacrylamide, vinylbenzene, divinylbenzene, vinyltoluene, styrene, α-methylstyrene, and p-methylstyrene. Here, for example, ethylene glycol di(meth)acrylate means ethylene glycol diacrylate and ethylene glycol dimethacrylate.

Further examples of the polymerizable compound having an ethylenically unsaturated bond in the present invention include an urethane compound that can be obtained by the reaction of a polyvalent isocyanate compound and a hydroxyalkyl unsaturated carboxylic acid ester compound, a compound that can be obtained by the reaction of a polyvalent epoxy compound and a hydroxyalkyl unsaturated carboxylic acid ester compound, a diallyl ester compound such as diallyl phthalate, and a divinyl compound such as divinyl phthalate.

As the polymerizable compound having an epoxy ring, a compound having one to six epoxy ring(s) may be used. Examples of the polymerizable compound having one to six epoxy ring(s) include a compound having two or more glycidyl ether structures or glycidyl ester structures that can be prepared from a compound having two or more hydroxy groups or carboxy groups such as a diol compound, a triol compound, a dicarboxylic acid compound, and a tricarboxylic acid compound and a glycidyl compound such as epichlorohydrin.

Specific examples of the polymerizable compound having an epoxy ring include 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexane carboxylate, trimethylolethane triglycidyl ether, triglycidyl-p-aminophenol, tetraglycidyl meta-xylene diamine, tetraglycidyl diaminodiphenylmethane, tetraglycidyl-1,3-bisaminomethylcyclohexane, bisphenol-A-diglycidyl ether, bisphenol-S-diglycidyl ether, pentaerythritol tetraglycidyl ether, resorcinol diglycidyl ether, phthalic acid diglycidyl ester, neopentyl glycol diglycidyl ether, polypropylene glycol diglycidyl ether, tetrabromobisphenol-A-diglycidyl ether, bisphenol hexafluoroacetone diglycidyl ether, pentaerythritol diglycidyl ether, hydrogenated bisphenol-A-diglycidyl ether, tris-(2,3-epoxypropyl)isocyanurate, 1-{2,3-di(propionyloxy)}-3,5-bis(2,3-epoxypropyl)-1,3,5-triazine-2,4,6.(1H,3H,5H)-trione, 1,3-bis{2,3-di(propionyloxy)}-5-(2,3-epoxypropyl)-1,3,5-triazine-2,4,6.(1H,3H,5H)-trione, monoallyl diglycidyl isocyanurate, diglycerol polydiglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, polyethylene glycol diglycidyl ether, phenyl glycidyl ether, p-tertiary butylphenyl glycidyl ether, adipic acid diglycidyl ether, o-phthalic acid diglycidyl ether, dibromophenyl glycidyl ether, 1,2,7,8-diepoxyoctane, 1,6-dimethylolperfluorohexane diglycidyl ether, 4,4'-bis(2,3-epoxypropoxyperfluoroisopropyl) diphenyl ether, 2,2-bis(4-glycidyloxyphenyl)propane, 3,4-epoxycyclohexylmethyl-3',4'-epoxycyclohexane carboxylate, 3,4-epoxycyclohexyloxirane, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycol-bis(3,4-epoxycyclohexane carboxylate), bis-(3,4-epoxycyclohexylmethyl) adipate, and bis(2,3-epoxycyclopentyl)ether.

As the polymerizable compound having an oxetane ring, a compound having one to six oxetane ring(s) may be used. Examples thereof include 3-ethyl-3-hydroxymethyloxetane, 3-ethyl-3-(phenoxymethyl)oxetane, 3,3-diethyloxetane, and 3-ethyl-3-(2-ethylhexyloxymethyl)oxetane, 1,4-bis(((3-ethyl-3-oxetanyl)methoxy)methyl)benzene, di((3-ethyl-3-oxetanyl)methyl)ether, and pentaerythritol tetrakis((3-ethyl-3-oxetanyl)methyl)ether.

As the polymerizable compound having a vinyl ether structure, a compound having one to six vinyl ether structure(s) may be used. Examples thereof include vinyl-2-chloroethyl ether, vinyl-n-butyl ether, 1,4-cyclohexanedimethanol divinyl ether, vinyl glycidyl ether, bis(4-(vinyloxymethyl)cyclohexylmethyl) glutarate, tri(ethylene glycol)divinyl ether, adipic acid divinyl ester, diethylene glycol divinyl ether, tris(4-vinyloxy)butyl trimellitate, bis(4-(vinyloxy)butyl) terephthalate, bis(4-(vinyloxy)butyl isophthalate, ethylene glycol divinyl ether, 1,4-butanediol divinyl ether, tetramethylene glycol divinyl ether, tetraethylene glycol divinyl ether, neopentyl glycol divinyl ether, trimethylolpropane trivinyl ether, trimethylolethane trivinyl ether, hexanediol divinyl ether, 1,4-cyclohexanediol divinyl ether, tetraethylene glycol divinyl ether, pentaerythritol divinyl ether, pentaerythritol trivinyl ether, and cyclohexanedimethanol divinyl ether.

The polymerizable compound-dispersed silica sol of the present invention has a silica concentration of 5 to 70% by mass, and preferably 15 to 60% by mass.

In the polymerizable compound-dispersed silica sol of the present invention, the dispersed colloidal silica particles may have a surface with hydrophobic treatment. Examples of the hydrophobic treatment agent include silazane, siloxane, alkoxysilane, a partial hydrolysate thereof, and a dimeric to pentameric oligomer polymerized therefrom.

As the hydrophobic treatment agent, the same hydrophobic treatment agents as those contained in the organic solvent-dispersed silica sol described above are exemplified. Among them, the hydrophobizing agent containing a polymerizable group may be preferably used because the hydrophobizing agent may improve the dispersibility to the polymerizable compound or may bind the colloidal silica particles and a resin in a curing reaction to improve resin performance.

Furthermore, the polymerizable compound-dispersed silica sol of the present invention may include a small amount of an organic solvent for viscosity control and the like.

The polymerizable compound-dispersed silica sol of the present invention is a stable silica sol in which decomposition, discoloration, polymerization, and the like of the polymerizable compound are not caused even with a high concentration because the dispersed colloidal silica particles have large negative charge and extremely weak characteristics as the solid acid.

Furthermore, among the polymerizable compound-dispersed silica sol of the present invention, the polymerizable compound-dispersed silica sol specifically having an epoxy ring is a very useful silica sol in the point that a cured product using the silica sol is rarely discolored by silica. Furthermore, when a cured product obtained from the polymerizable compound having an epoxy ring has high transparency and strength, the combination of the resin and the colloidal silica particles of the present invention can provide a clear and colorless cured product having higher heat resistance and strength. Therefore, when the cured product is used for a sealer and the like requiring colorlessness, transparency, and heat resistance such as an LED sealer, especially excellent effect is obtained.

The polymerizable compound having an epoxy ring used in the present invention is preferably an ester modified epoxy compound containing a compound (i) having a functional group of Formula (1):

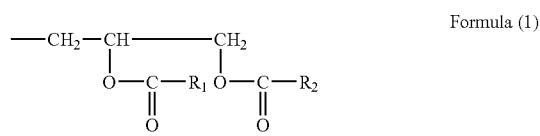

Formula (1)

(where each of $R_1$ and $R_2$ is independently an alkyl group, an alkenyl group, an alkynyl group, an aryl group, an aralkyl group, or a heterocyclic group, or a halogenated, aminated, or nitrated derivative thereof) in the molecule and a compound (ii) having a glycidyl group in the molecule.

The compound (i) is a compound in which n pieces of glycidyl groups (where n is an integer of 2 to 16) in the molecule are replaced with one or more and n pieces or less of the functional group(s) of Formula (1). Furthermore, the compound (ii) is a compound having n pieces of the glycidyl groups (where n is an integer of 2 to 16) in the molecule.

In the polymerizable compound having an epoxy ring used in the present invention, in an epoxy compound to be the raw material of the compound (i) and the epoxy compound shown by the compound (ii), n is preferably 3. Furthermore, for an epoxy compound to be the raw material of the compound (i) and the epoxy compound shown by the compound (ii), tris-(2,3-epoxypropyl)-isocyanurate is preferably used. When tris-(2,3-epoxypropyl)-isocyanurate is used, a cured object having excellent light resistance, weather resistance, heat resistance, transparency, and the like can be obtained. Namely, the compound (i) is preferably a compound in which the glycidyl group in tris-(2,3-epoxypropyl)-isocyanurate is replaced with the functional group of Formula (1). Furthermore, the compound (ii) is preferably tris-(2,3-epoxypropyl)-isocyanurate.

In the polymerizable compound having an epoxy ring used in the present invention, as the compound having the glycidyl group in the molecule, tris-(2,3-epoxypropyl)-isocyanurate will be described in detail. Tris-(2,3-epoxypropyl)-isocyanurate is an epoxy resin having three glycidyl groups per molecule with high crystallizability. The reason why tris-(2,3-epoxypropyl)-isocyanurate has high crystallizability is supposed that the oxygen atoms of three epoxy groups present in the molecule form hydrogen bonds with other molecules. The oxygen atom of the epoxy group is transformed by a chemical reaction to reduce the crystallizability to turn into liquid. However, the epoxy group is required for the curing reaction between the epoxy resin and a curing agent for curing. Accordingly, the ester modified epoxy compound in a liquid form is required to be a mixture of the compound (i) in which the epoxy groups are partially transformed and the compound (ii) in which the epoxy groups are not transformed.

When the polymerizable compound having an epoxy ring used in the present invention includes tris-(2,3-epoxypropyl)-isocyanurate in which the glycidyl group is replaced with the functional group of Formula (1) and tris-(2,3-epoxypropyl)-isocyanurate, a polymerizable compound in a liquid form having an epoxy ring can be obtained. The compound (i) is practically a mixture of a compound in which the acid anhydride of Formula (2) is added to one of the glycidyl groups of tris-(2,3-epoxypropyl)-isocyanurate, a compound in which the acid anhydride is added to two of the glycidyl groups, and a compound in which the acid anhydride is added to the three glycidyl groups.

In the polymerizable compound having an epoxy ring used in the present invention, the preferable compound is obtained by the reaction of tris-(2,3-epoxypropyl)-isocyanurate and the acid anhydride in a molar ratio of glycidyl group of tris-(2,3-epoxypropyl)-isocyanurate:acid anhydride molar ratio=1:0.1 to 0.5. It is preferable that an ester modified epoxy compound containing a mixture of a compound in which the acid anhydride of Formula (2) is added to one of the glycidyl groups of tris-(2,3-epoxypropyl)-isocyanurate, a compound in which the acid anhydride is added to two of the glycidyl groups, and a compound in which the acid anhydride is added to the three glycidyl groups (the compound (i)) and tris-(2,3-epoxypropyl)-isocyanurate (the compound (ii)) in a molar ratio of compound (i):compound (ii)=1:0.3 to 1.5 can be obtained.

In the polymerizable compound having an epoxy ring used in the present invention, the acid anhydride [Formula (2)] used for the preparation of the compound (i) is a so-called acid anhydride obtained from two molecules of a monocarboxylic acid. It is different from the acid anhydride that is obtained from a dicarboxylic acid and is used as the curing agent for epoxy resins, and does not have the function as the curing agent for epoxy resins.

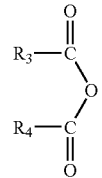

Formula (2)

The sum of the glycidyl groups in the synthesized compound (i) and the glycidyl groups in the compound (ii) is preferably two or more on average in terms of per molecule (the total number of glycidyl groups is divided by the total number of molecules). When the sum of the glycidyl groups is less than 2, it is not preferable because the physical properties of the cured object, specifically, the heat resistance is reduced.

The acid anhydride [Formula (2)] used in the present invention is not specifically limited, but in Formula (2), each of $R_3$ and $R_4$ is independently an alkyl group, an alkenyl group, an alkynyl group, an aryl group, an aralkyl group, a heterocyclic group, or a halogenated, aminated, or nitrated derivative group thereof.

The alkyl group is a $C_{1-18}$ alkyl group. Examples thereof include a methyl group, an ethyl group, an n-propyl group, an i-propyl group, a cyclopropyl group, an n-butyl group, an i-butyl group, an s-butyl group, a t-butyl group, a cyclobutyl group, a 1-methyl-cyclopropyl group, a 2-methyl-cyclopropyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, a cyclopentyl group, a 1-methyl-cyclobutyl group, a 2-methyl-cyclobutyl group, a 3-methyl-cyclobutyl group, a 1,2-dimethyl-cyclopropyl group, a 2,3-dimethyl-cyclopropyl group, a 1-ethyl-cyclopropyl group, a 2-ethyl-cyclopropyl group, an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, a 1-ethyl-2-methyl-n-propyl group, a cyclohexyl group, a 1-methyl-cyclopentyl group, a 2-methyl-cyclopentyl group, a 3-methyl-cyclopentyl group, a 1-ethyl-cyclobutyl group, a 2-ethyl-cyclobutyl group, a 3-ethyl-cyclobutyl group, a 1,2-dimethyl-cyclobutyl group, a 1,3-dimethyl-cyclobutyl group, a 2,2-dimethyl-cyclobutyl group, a 2,3-dimethyl-cyclobutyl group, a 2,4-dimethyl-cyclobutyl group, a 3,3-dimethyl-cyclobutyl group, a 1-n-propyl-cyclopropyl group, a 2-n-propyl-cyclopropyl group, a 1-i-propyl-cyclopropyl group, a 2-i-propyl-cyclopropyl group, a 1,2,2-trimethyl-cyclopropyl group, a 1,2,3-trimethyl-cyclopropyl group, a 2,2,3-trimethyl-cyclopropyl group, a 1-ethyl-2-methyl-cyclopropyl group, a 2-ethyl-1-methyl-cyclopropyl group, a 2-ethyl-2-methyl-cyclopropyl group, a 2-ethyl-3-methyl-cyclopropyl group, a n-heptyl group, and a cyclohexyl group.

The alkenyl group is a $C_{2-6}$ alkenyl group. Examples thereof include a vinyl group, a 1-propenyl group, and a 2-propenyl group.

The alkynyl group is a $C_{2-6}$ alkynyl group. Examples thereof include an ethynyl group and a propargyl group.

The aryl group is a $C_{6-20}$ aryl group. Examples thereof include a phenyl group, a tolyl group, a naphthyl group, a methylnaphthyl group, an anthryl group, and an ethylanthryl group.

The aralkyl group is a $C_{7-22}$ aralkyl group. Examples thereof include a benzyl group, a phenethyl group, a naphthylmethyl group, a naphthylethyl group, an anthryl group, and an anthrylmethyl group.

Examples of the heterocyclic group include an imidazole group, a pyrazole group, a pyridazine group, a pyrimidine group, a quinoline group, a benzoxazole group, a thiophene group, a dithiol group, a thiazole group, a thiadiazole group, and a benzothiazole group.

The alkyl group, the alkenyl group, the alkynyl group, the aryl group, the aralkyl group, and the heterocyclic group may be used as a halogenated (for example, fluorinated, chlorinated, brominated, or iodinated), aminated, or nitrated derivative group. Examples thereof include a chloromethyl group, a dichloromethyl group, a trichloromethyl group, a trifluoromethyl group, an aminophenyl group, and a nitrobenzyl group.

$R_3$ and $R_4$ may be the same or different. Examples of the acid anhydride of Formula (2) containing $R_3$ and $R_4$ include acetic anhydride, propionic anhydride, n-butyric anhydride, n-valeric anhydride, n-hexanoic anhydride, trifluoroacetic anhydride, cinnamic anhydride, and benzoic anhydride. According to the type of the used acid anhydride [Formula (2)], $R_3$ and $R_4$ in Formula (2) are determined, but each of $R_3$ and $R_4$ is preferably a linear $C_{1-5}$ hydrocarbon group from the point of the transparency of the obtained cured object. In particular, propionic anhydride is preferred.

When tris-(2,3-epoxypropyl)-isocyanurate is used as the epoxy resin with high crystallizability, a low-melting type (α-form) stereoisomer of tris-(2,3-epoxypropyl)-isocyanurate is preferably used. Tris-(2,3-epoxypropyl)-isocyanurate synthesized from isocyanuric acid and epichlorohydrin is a mixture containing a low-melting type stereoisomer of tris-(2,3-epoxypropyl)-isocyanurate (crystal in the α-form, called α-form) and a high-melting type stereoisomer of tris-(2,3-epoxypropyl)-isocyanurate (crystal in the β-form, called β-form) with a ratio of 3:1. The reason for this is that epichlorohydrin as the raw material is an equimolar mixture of the R type and S type optical isomers. The synthesized tris-(2,3-epoxypropyl)-isocyanurate includes eight types of tris-(2,3-epoxypropyl)-isocyanurate, that is, RRR, SSS, RSS, SSR, SRS, RRS, RSR, and SRR configurations, in the same ratio because three molecules of epichlorohydrin are added to a molecule of isocyanuric acid. Here, the crystal of tris-(2,3-epoxypropyl)-isocyanurate formed from the combination of the RRR isomer and the SSS isomer is the β-form tris-(2,3-epoxypropyl)-isocyanurate, and the crystal formed from the combination of the other six isomers of tris-(2,3-epoxypropyl)-isocyanurate is the α-form tris-(2,3-epoxypropyl)-isocyanurate. Accordingly, the crystals are formed in the ratio above. The α-form tris-(2,3-epoxypropyl)-isocyanurate has a melting point of 98 to 107° C. (the value measured using automatic melting point determination method Mettler with a temperature increase rate of 2° C./min, hereinafter the same shall apply), and have a remarkably higher solubility with respect to a solvent comparing with the β-form tris-(2,3-epoxypropyl)-isocyanurate having a melting point of 152 to 158° C. This difference corresponds to the difference between the intermolecular interaction of tris-(2,3-epoxypropyl)-isocyanurate forming the α-form and the intermolecular interaction of tris-(2,3-epoxypropyl)-isocyanurate forming the β-form crystals, and means that the β-form crystal has high crystallizability. Thus, in the case that tris-(2,3-epoxypropyl)-isocyanurate is applied to the liquid polymerizable compound having an epoxy ring used in the present invention, when the unreacted tris-(2,3-epoxypropyl)-isocyanurate is the α-form, the crystal is not readily precipitated. Therefore, it is preferable that the α-form tris-(2,3-epoxypropyl)-isocyanurate be used as the raw material.

Next, the reaction of tris-(2,3-epoxypropyl)-isocyanurate and an acid anhydride will be described. The solvent used for the reaction may be any solvent as far as the solvent is inert with respect to the reaction. Typical examples of the solvent include ketones such as acetone and methyl ethyl ketone, nitriles such as acetonitrile, ethers such as tetrahydrofuran and dioxane, esters such as ethyl acetate, aromatic hydrocarbons such as chlorobenzene and toluene, and halogenated hydrocarbons such as chloroform and dichloroethane. These solvents are used alone or as a mixed solvent and dissolve tris-(2,3-epoxypropyl)-isocyanurate. Tertiary amines such as triethylamine, tripropylamine, and 1,8-diazabicyclo-5,4,0-undecane-7-ene, quaternary phosphonium salts such as a halogenated triphenyl monoalkyl phosphonium represented by triphenylethylphosphonium bromide and the like, imidazole compounds such as 2-ethyl-4-methylimidazole, quaternary ammonium salts such as tetraethylammonium bromide, and phosphorus compounds such as triphenylphosphine may be used as a catalyst as necessary. The reaction temperature is the reflux temperature of a solvent. The reaction is carried out until the epoxy group content determined by the titration using a solution of 0.1 N-perchloric acid/acetic acid reaches the theoretical value (the value where the added acid anhydride reacts to disappear). After the completion of the reaction, the solvent is removed by evaporation to give a liquid ester modified epoxy compound.

The obtained liquid ester modified epoxy compound contains, from the result of HPLC (high performance liquid chromatography) analysis, a mixture of a compound in which the acid anhydride of Formula (2) is added to one of the glycidyl groups of tris-(2,3-epoxypropyl)-isocyanurate, a compound in which the acid anhydride is added to two of the glycidyl groups, and a compound in which the acid anhydride is added to the three glycidyl groups (compound i) and unreacted tris-(2,3-epoxypropyl)-isocyanurate (compound ii). Furthermore, the obtained liquid ester modified epoxy compound contains a mixture of a compound in which the acid anhydride of Formula (2) is added to one of the glycidyl groups of tris-(2,3-epoxypropyl)-isocyanurate and a compound in which the acid anhydride is added to two of the glycidyl groups (compound i) and unreacted tris-(2,3-epoxypropyl)-isocyanurate (compound ii). Moreover, the obtained liquid ester modified epoxy compound contains a compound in which the acid anhydride of Formula (2) is added to one of the glycidyl groups of tris-(2,3-epoxypropyl)-isocyanurate (compound i) and unreacted tris-(2,3-epoxypropyl)-isocyanurate (compound ii).

The liquid ester modified epoxy compound has a viscosity of about 500 to 5000 mPa·s in the measurement at 60° C.

In the polymerizable compound-dispersed silica sol having an epoxy ring, the dispersed colloidal silica particles of the present invention have large negative charge and extremely weak characteristics as the solid acid. Thus, when the polymerizable compound-dispersed silica sol is mixed into an epoxy curing composition, silica can be filled in the cured product with high concentration and the cured object is colored little. Furthermore, the cured product of the polymerizable compound having an epoxy ring itself has high transparency and strength. When the resin and the colloidal silica particles of the present invention are combined, a cured product having very high heat resistance, colorlessness and transparency, and strength can be obtained. Thus, when the polymerizable compound-dispersed silica sol having an epoxy ring is used for an application requiring colorlessness and transparency and heat resistance such as an LED sealer, especially excellent effect is obtained.

The dicarboxylic anhydride-dispersed silica sol of the present invention is a dispersion of the colloidal silica particles of the present invention in a dicarboxylic anhydride in a liquid form at 30° C. Here, in a liquid form at 30° C." means being a liquid form at 30° C. under atmospheric pressure.

Specific examples of the dicarboxylic anhydride in a liquid form at 30° C. used in the dicarboxylic anhydride-dispersed silica sol of the present invention include methyltetrahydrophthalic anhydride, methylhexahydrophthalic anhydride, methylnadic anhydride, hydrogenated methylnadic anhydride, hydrogenated trimellitic acid, trialkylhydrophthalic anhydride, and dodecenylsuccinic anhydride.

Among the dicarboxylic anhydrides, methylhexahydrophthalic anhydride, hydrogenated methylnadic anhydride, and hydrogenated trimellitic acid are specifically preferred because the obtained epoxy cured product has high colorlessness and transparency, heat resistance, and light resistance. Furthermore, when a mixture of a dicarboxylic anhydride in a solid form such as hexahydrophthalic anhydride and the dicarboxylic anhydride in a liquid form is liquid at 30° C., the mixture may be used in the present invention.

The dicarboxylic anhydride-dispersed silica sol of the present invention has a silica concentration of 5 to 70% by mass, and preferably 15 to 60% by mass.

In the dicarboxylic anhydride-dispersed silica sol of the present invention, the dispersed colloidal silica particles may have a surface with hydrophobic treatment. Examples of the hydrophobic treatment agent include silazane, siloxane, alkoxysilane, a partial hydrolysate thereof, and a dimeric to pentameric oligomer polymerized therefrom.

As the hydrophobic treatment agent, the same hydrophobic treatment agents as those contained in the organic solvent-dispersed silica sol described above are exemplified.

In the dicarboxylic anhydride-dispersed silica sol of the present invention, the dispersed colloidal silica particles have large negative charge and extremely weak characteristics as the solid acid. Thus, when the silica sol is mixed into an epoxy curing composition, silica can be filled in the cured product with high concentration and the cured object is colored little. In particular, when the polymerizable compound-dispersed silica sol having an epoxy ring as the dispersion medium of the present invention is combined, the colloidal silica particles can be filled into the epoxy cured product with a high filling rate and with the colorlessness and transparency of the resin kept. Thus, when the silica sol is used for an application requiring colorlessness and transparency and heat resistance such as an LED sealer, especially excellent effect is obtained.

The colloidal silica particles of the present invention is colloidal silica particles that include at least one polyvalent metal element M selected from a group consisting of iron, aluminum, zinc, zirconium, titanium, tin, and lead in an average content of 0.001 to 0.02 in terms of M/Si molar ratio and that have an average primary particle diameter of 5 to 40 nm. In the colloidal silica particles, the content of the polyvalent metal element M present in an outermost layer of the colloidal particles is 0 to 0.003 atom per square nanometer of the surface area of the colloidal particles. The colloidal silica particles can be produced by a process including the steps (I) and (II):

(I): adding an acid to a silica sol containing colloidal silica particles so that the silica sol has a pH of 0 to 2.0, the colloidal silica particles including at least one polyvalent metal element M selected from a group consisting of iron, aluminum, zinc, zirconium, titanium, tin, and lead in an average content of 0.001 to 0.02 in terms of M/Si molar ratio and having an average primary particle diameter of 5 to 40 nm; and aging the sol at 0 to 40° C. for 0.5 to 100 hours, and (II): contacting the acidic silica sol obtained in (I) with a strongly acidic cation-exchange resin in the hydrogen form at a pH of 0 to 2.0, and further contacting the sol with a strongly basic anion-exchange resin in the hydroxy form.

In the step (I), an aqueous silica sol dispersing colloidal silica particles including at least one polyvalent metal element M selected from a group consisting of iron, aluminum, zinc, zirconium, titanium, tin, and lead in an average content of 0.001 to 0.02 in terms of M/Si molar ratio and having an average primary particle diameter of 5 to 40 nm can be obtained according to, for example, the process disclosed in Japanese Patent Application Publication No. JP-A-63-123807. For example, the process in which, to an aqueous solution of an alkali metal silicate such as sodium silicate, an aqueous solution of an aluminum compound is mixed to give an aqueous solution as the raw material, and then the silica sol is particle-controlled is described. Furthermore, as another process, the process for producing the silica sol in which, when the silica sol is particle-controlled, an aqueous solution of an aluminum compound is added, specifically, to an alkaline aqueous solution containing silica or an aqueous solution of an alkali metal hydroxide, an acidic silicic acid solution and an aqueous solution of an aluminum compound are simultaneously or alternately added to particle-control the silica sol is described. The used aluminum compound is an aluminate represented by sodium aluminate or an acidic aluminum salt represented by aluminum sulfate and aluminum chloride. A tin compound, a zinc compound, a lead compound, and the like may be used other than the above aluminum compound, and sodium stannate, sodium zincate, sodium plumbite, and the like may be specifically used.

Next, to the obtained aqueous silica sol, an acid is added. The used aqueous silica sol has a silica concentration of 40% by mass or less, and suitably 30% by mass or less. When the silica concentration is more than 40% by mass, the silica sol may have an increased viscosity or turn into a gel. Furthermore, when the silica concentration is remarkably low (for example less than 5% by mass), the producing efficiency is reduced. Thus, it is preferable that the sol is concentrated with an ultrafiltration membrane and the like to make the silica concentration 5% by mass or more and then an acid is added. The aqueous silica sol that may be used when an acid is added may be an alkaline silica sol and an acidic silica sol in which the alkali metal ions in the alkaline silica sol are removed by a cation exchange resin and the like. The type of the acid to be added is preferably a strong acid among inorganic acids or organic acids in consideration of the effect for eluting polyvalent metal ions from the colloidal silica particles. Specifically, hydrochloric acid, sulfuric acid, nitric acid, phosphoric acid, benzenesulfonic acid, and the like are selected. When the acid is added to the aqueous silica sol, an aqueous solution of the acid having an acid concentration of 1 to 20% by mass is preferably added. The addition amount of the acid is determined so that the aqueous silica sol would have a pH in range from 0 to 2.0. When the pH is more than 2.0, the colloidal silica particles have insufficient effect for eluting the polyvalent metal elements as the polyvalent metal ions from near the surface of the colloidal silica particles. The acid is added to make the pH of the aqueous silica sol in a range from 0 to 2.0, and then the sol is aged at 0° C. to 40° C. for 30 minutes to 100 hours. When the aging temperature is below the range, the effect for eluting the polyvalent metal ions from near the surface of the colloidal silica particles becomes insufficient.

In the next step (II), first, the acidic silica sol obtained in the step (I) is brought into contact with a strongly acidic cation-exchange resin in the hydrogen form to remove the polyvalent metal ion eluted from near the surface of the colloidal silica particles. At the time, the acidic silica sol is checked to have a pH of 2.0 or less. When the pH is more than 2.0, the polyvalent metal ion may not be sufficiently eluted, and a part of the eluted polyvalent metal ion is not sufficiently adsorbed on the cation exchange resin to remain on the surface of the colloidal silica particles. Next, the sol is brought into contact with a strongly basic anion-exchange resin in the hydroxy form to remove the excess negative ion component. Because the strongly basic anion-exchange resin in the hydroxy form is usually regenerated with a strong base such as sodium hydroxide, a trace amount of the sodium ion or the like remains. Thus, after the acidic silica sol is brought into contact, a trace amount of the sodium ion or the like may leak in the acidic silica sol. In this case, the sol is preferably brought into contact with the strongly acidic cation-exchange resin once again to remove the sodium ion or the like. Furthermore, before the sol is brought into contact with a strongly acidic cation-exchange resin in the hydrogen form and a strongly basic anion-exchange resin in the hydroxy form, pure water may be added to the aqueous silica sol to adjust the silica concentration. According to the process including the step (I) and the step (II), the colloidal silica particles of the present invention can be obtained.

The organic solvent-dispersed silica sol of the present invention is produced by a process in which water contained in the aqueous silica sol dispersing the colloidal silica particles of the present invention obtained by the above producing method is replaced with an organic solvent. The organic solvent replacement of the aqueous silica sol may be carried out by any method known in the art, and examples thereof include a distillation replacement method and an ultrafiltration method. When the organic solvent is a hydrophobic organic solvent such as methyl ethyl ketone, methyl isobutyl ketone, ethyl acetate, and toluene, the method in which a hydrophobic treatment is carried out on the surface of the colloidal silica particles in the aqueous silica sol, and then water is replaced with a desired solvent can be applied. The known methods of the hydrophobic treatment are the method in which an aqueous silica sol is heated in the presence of an excess alcohol to esterify the silanol group on the surface of the colloidal silica particles (Japanese Patent Application Publication No. JP-A-57-196717) and the method in which the silica surface is treated with a silylation agent or a silane coupling agent (Japanese Patent Application Publication No. JP-A-58-145614, Japanese Patent Application Publication No. JP-A-03-187913, and Japanese Patent Application Publication No. JP-A-11-43319).

The polymerizable compound-dispersed silica sol of the present invention is produced by replacing, with the polymerizable compound, the organic solvent that is the dispersion medium of the organic solvent-dispersed silica sol dispersing the colloidal silica particles of the present invention obtained by the above producing process. A polymerizable compound is added to the organic solvent-dispersed silica sol, and at least a part of the organic solvent is removed by evaporation with stirring under reduced pressure or under ambient pressure at room temperature or with heating to give the polymerizable compound-dispersed silica sol of the present invention. The condition for replacing an organic solvent with a polymerizable compound may be any condition under which the organic solvent can be removed by evaporation without polymerization and decomposition of the polymerizable compound. The pressure in a container for the replacement and the liquid temperature are properly controlled. When the organic solvent is replaced with the polymerizable compound, all of the required amount of the polymerizable compound may be added to the organic solvent-dispersed silica sol, and then the organic solvent may be removed by evaporation. Alternatively, while removing the organic solvent of the organic solvent-dispersed silica sol by evaporation, the polymerizable compound may gradually be added to the organic solvent-dispersed silica sol to replace. When the organic solvent is removed by evaporation, attention should be paid to prevent the silica sol from turning into a gel due to excessively high silica concentration. The polymerizable compound-dispersed silica sol of the present invention may be a silica sol in which the dispersion medium is almost the polymerizable compound alone after the organic solvent of the organic solvent-dispersed silica sol of the present invention is almost completely removed by evaporation, or, in order to prevent the viscosity increase, may be a sol in a mixed dispersion medium of the polymerizable compound and the organic solvent with a part of the organic solvent remaining. The mixed dispersion medium preferably has a polymerizable compound/organic solvent mass ratio in a range from 100:0 to 50:50.

Furthermore, the polymerizable compound-dispersed silica sol of the present invention can also be produced by directly replacing, with the polymerizable compound, water that is the dispersion medium of the aqueous silica sol dispersing the colloidal silica particles of the present invention obtained by the producing method.

The dicarboxylic anhydride-dispersed silica sol of the present invention can be produced from the non-alcoholic organic solvent-dispersed silica sol among the organic solvent-dispersed silica sol dispersing the colloidal silica particles of the present invention obtained by the above producing method. That is, the dicarboxylic anhydride-dispersed silica sol can be produced by replacing the non-alcoholic organic solvent of the non-alcoholic organic solvent-dispersed silica sol with a dicarboxylic anhydride in a liquid form at 30° C. A dicarboxylic anhydride is added to the non-alcoholic organic solvent-dispersed silica sol, and at least a part of the organic solvent is removed by evaporation with stirring under reduced pressure or under ambient pressure at room temperature or with heating to give the dicarboxylic anhydride-dispersed silica sol.

When the non-alcoholic organic solvent is replaced with the dicarboxylic anhydride, all of the required amount of the dicarboxylic anhydride may be added to the non-alcoholic organic solvent-dispersed silica sol, and then the organic solvent may be removed by evaporation. Alternatively, while removing the organic solvent of the non-alcoholic organic solvent-dispersed silica sol by evaporation, the dicarboxylic anhydride may gradually be added to the organic solvent-dispersed silica sol to replace. When the organic solvent is removed by evaporation, attention should be paid to prevent the silica sol from turning into a gel due to excessively high silica concentration.

The dicarboxylic anhydride-dispersed silica sol of the present invention may be a silica sol in which the dispersion medium is almost the dicarboxylic anhydride alone after the organic solvent of the non-alcoholic organic solvent-dispersed silica sol is almost completely removed by evaporation, or, in order to prevent the viscosity increase, may be a sol in a mixed dispersion medium of the dicarboxylic anhydride and the non-alcoholic organic solvent with the non-alcoholic organic solvent remaining. The mixed dispersion medium preferably has a dicarboxylic anhydride/non-alcoholic organic solvent mass ratio in a range from 100:0 to 50:50.

The non-alcoholic organic solvent preferably has low reactivity with the dicarboxylic anhydride, and examples thereof include ethers, esters, ketones, and hydrocarbons. Examples of the ethers include diethyl ether, dipropyl ether, dibutyl ether, tetrahydrofuran, and dioxane. Examples of the esters include ethyl formate, methyl acetate, ethyl acetate, propyl acetate, butyl acetate, ethylene glycol monoethyl ether acetate, and ethylene glycol monobutyl ether acetate. Examples of the ketones include acetone, methyl ethyl ketone, 2-pentanone, 3-pentanone, methyl isobutyl ketone, 2-heptanone, and cyclohexanone. Examples of the hydrocarbons include n-hexane, cyclohexane, benzene, toluene, xylene, solvent naphtha, dichloromethane, and trichloroethylene. Examples of other organic solvents include acetonitrile, acetamide, N,N-dimethylformamide, dimethylsulfoxide, N,N-dimethylacetamide, and N-methylpyrrolidone.

EXAMPLES

Analytical Method

[$SiO_2$ Concentration]

A silica sol was placed into a crucible and dried at 130° C. Then, the obtained gel was calcined at 800° C. and the calcined residue was weighed to calculate the $SiO_2$ concentration.

[Average Primary Particle Diameter (Particle Diameter by Nitrogen Adsorption Method)]

The specific surface area of the powder that is a dried acidic silica sol at 300° C. was measured with a specific surface area analyzer MONOSORB (registered trademark) MS-16 (manufactured by Yuasa Ionics Inc.).

[Zeta Potential]

An acidic silica sol was diluted with pure water, and adjusted with 0.1 N aqueous hydrochloric acid solution to have a pH of 3.5. Then, the zeta potential of the colloidal silica particles was measured with a laser zeta potential analyzer ELS-6000 (manufactured by Otsuka Electronics Co., Ltd.).

[Water Content]

Measured by a Karl Fischer titration method.

[Organic Solvent Content]

Measured by gas chromatography.

The following gas chromatography conditions were adopted:

Column: 3 mm×1 m glass column, Filler: PoraPak Q, Column Temperature: 130 to 230° C. (a temperature rise of 8° C./min), Carrier: $N_2$ 40 mL/min, Detector: FID, Injection Volume: 1 μL, Internal Standard: methyl ethyl ketone or acetonitrile.

[Viscosity]

The viscosity of a silica sol was measured with a B-type rotational viscometer (manufactured by Toki Sangyo Co., Ltd.).

[Analysis of Content of Polyvalent Metal Element in Outermost Layer of Colloidal Silica Particles]

When the number of Si atoms present in the outermost layer of colloidal silica particles is 7.9 per square nanometer, in the case that the average content of the polyvalent metal element M is a molar ratio of M/Si, the number of the polyvalent metal element M present in the outermost layer of the colloidal silica particles is calculated as 7.9×M/Si per square nanometer. As a result of the intensive studies for quantitatively determining the polyvalent metal element in the outermost layer of the colloidal silica particles, it was revealed that, when an aqueous sol containing colloidal silica particles is adjusted to have a pH of 1.9 with nitric acid and kept at 20 to 25° C. for 4.5 hours, only the polyvalent metal element in the outermost layer is cationized. The silica sol adjusted to have a pH of 1.9 with nitric acid was subjected to centrifugation, and the content of the polyvalent metal element in the filtrate was measured to quantitatively determine the polyvalent metal element present in the outermost layer of the colloidal silica particles. For example, in the colloidal silica particles in Reference Example 1, it is supposed that the polyvalent metal elements are almost equally present in the particles, and the M/Si molar ratio was 0.0028. From the value, the polyvalent metal element in the outermost layer was calculated as 7.9× 0.0028=0.022 atom per square nanometer. On the other hand, the acidic silica sol 1a was adjusted to have a pH of 1.9 with nitric acid, kept at 20 to 25° C. for 4.5 hours, and subjected to centrifugal filtration to give the filtrate. The content of the polyvalent metal element in the filtrate was determined by plasma emission spectrometry as 0.020 atom per square nanometer, which almost corresponded to the calculated value.

The specific measurement method of the content of the polyvalent metal element in the outermost layer of colloidal silica particles was as follows.

As $SiO_2$, 1.0 g of an acidic silica sol was taken and diluted with 50 g of pure water, then adjusted to have a pH of 1.9 with 10% by mass of nitric acid (EL grade), and kept at 23° C. for 4.5 hours. The sol was placed in a centrifugal filter (Amicon Ultra-15, manufactured by MILLIPORE, a molecular weight cut off of 10,000), and centrifuged at 5,000 rpm for 30 minutes. The obtained filtrate was subjected to a metal analysis with a plasma emission spectrometer (SPS7800, manufactured by Seiko Instruments Inc.). The polyvalent metal element measured by the method is the polyvalent metal element present in the outermost layer of the colloidal silica particles. This value is divided by the surface area of the colloidal silica particles obtained by the nitrogen adsorption method to calculate the content of the polyvalent metal element M present in 1 $nm^2$ of the outermost layer of the colloidal silica particles.

Reference Example 1

To a 100 L plastic container, 9.6 kg of a sodium silicate solution (manufactured by Fuji Kagaku Corp., No. 3 sodium silicate, a $SiO_2$ concentration of 29.1% by mass, a $SiO_2/Na_2O$ molar ratio of 3.2, and an $Al_2O_3/SiO_2$ molar ratio of 0.0003) and 60.2 kg of pure water were placed and stirred so as to be homogeneous. To the diluted sodium silicate solution, 1.98 kg of an aqueous solution of sodium aluminate (an $Al_2O_3$ concentration of 1.0% by mass and a $Na_2O$ concentration of 0.77% by mass) was added with stirring with a disper, and the whole was stirred for 30 minutes. The obtained aqueous solution was passed through a column filled with 24 L of a strongly acidic cation-exchange resin in the hydrogen form (Amberlite (registered trademark) IR-120B, manufactured by Organo Corporation) to give 70.0 kg of an activated silica solution (a $SiO_2$ concentration of 3.7% by mass and a pH of 2.8). To a 100 L stainless steel container with a reflux condenser, a stirrer, a heater, and a pouring hole, 0.31 kg of the sodium silicate solution and 9.1 kg of pure water were placed, and the whole was heated to 90° C. to make a heel solution. Keeping the heel solution at 90° C., to the heel solution, 69.6 kg of the activated silica solution was added from the pouring hole at a constant flow rate over 6 hours. After the completion of the addition, the solution was kept at 90° C. for 4 hours, and then concentrated by an ultrafiltration method to give 9.0 kg of an alkaline silica sol 1 having a $SiO_2$ concentration of 28.5% by mass (an average primary particle diameter (particle diameter by a nitrogen adsorption method) of 12 nm and a pH of 9.8). The obtained alkaline silica sol 1 was passed through a column filled with 1.5 L of a strongly acidic cation-exchange resin in the hydrogen form (Amberlite (registered trademark) IR-120B, manufactured by Organo Corporation), a column filled with 1.0 L of a strongly basic anion-exchange resin in the hydroxy form (Amberlite (registered trademark) IR-410, manufactured by Organo Corporation), and a column filled with 300 mL of a strongly acidic cation-exchange resin in the hydrogen form (Amberlite IR-120B) in this order to give 10.0 kg of an acidic silica sol 1a (a $SiO_2$ concentration of 25.0% by mass, an average primary particle diameter of 12 nm, a pH of 2.8, an average content of at least one polyvalent metal element M selected from a group consisting of iron, aluminum, zinc, zirconium, titanium, tin, and lead in the colloidal silica particles: M/Si molar ratio of 0.0028, the polyvalent metal element M present in the outermost layer of the colloidal silica particles of 0.020 atom/$nm^2$, and a zeta potential of −24 mV).

Reference Example 2

To 4000 g of the acidic silica sol 1a obtained in Reference Example 1, 74.0 g of a 10% by mass aqueous sodium hydroxide solution was added to alkalify the sol (a pH of 9.2), and then the hydrothermal treatment was carried out on the sol with a 3 L stainless-steel autoclave container at 205° C. for 2.5 hours to prepare an alkaline silica sol 2. The hydrothermal treatment was carried out twice on each 2000 g of the alkalified sol. The obtained alkaline silica sol 2 had a $SiO_2$ concentration of 25.0% by mass, an average primary particle diameter of 22 nm, and a pH of 10.3. Through a column filled with 500 mL of a strongly acidic cation-exchange resin in the hydrogen form (Amberlite IR-120B), 4000 g of the alkaline silica sol 2 was passed to give 4000 g of an acidic silica sol 2a (a $SiO_2$ concentration of 25.0% by mass, an average primary particle diameter of 22 nm, a pH of 2.5, an average content of the polyvalent metal element M: an M/Si molar ratio of 0.0027, the polyvalent metal element M present in the outermost layer of the colloidal silica particles of 0.038 atom/$nm^2$, and a zeta potential of −28 mV).

The physical properties of the silica sols obtained in Reference Examples 1 and 2 are shown in Table 1.

TABLE 1

|  | Reference Example 1 Acidic silica sol 1a | Reference Example 2 Acidic silica sol 2a |
| --- | --- | --- |
| Average primary particle diameter (nm) | 12 | 22 |
| $SiO_2$ (% by mass) | 25.0 | 25.0 |
| pH | 2.8 | 2.5 |
| Zeta potential (mV) | −24 | −28 |
| M/Si (average content) (molar ratio) | 0.0028 | 0.0027 |
| Fe/Si | 0.00002 | 0.00002 |
| Al/Si | 0.00271 | 0.00256 |
| Ti/Si | 0.00007 | 0.00006 |
| Zr/Si | 0.00002 | 0.00002 |
| Zn/Si | <0.00001 | <0.00001 |
| Pb/Si | <0.00001 | <0.00001 |
| Sn/Si | <0.00001 | <0.00001 |
| Polyvalent metal element M in outermost layer of colloidal silica particles (atom/$nm^2$) | 0.020 | 0.038 |
| Fe | <0.0001 | <0.0001 |
| Al | 0.0198 | 0.0383 |
| Ti | <0.0001 | <0.0001 |
| Zr | <0.0001 | <0.0001 |

TABLE 1-continued

|  | Reference Example 1 Acidic silica sol 1a | Reference Example 2 Acidic silica sol 2a |
| --- | --- | --- |
| Zn | <0.0001 | <0.0001 |
| Pb | <0.0001 | <0.0001 |
| Sn | <0.0001 | <0.0001 |

Example 1

In a 3 L polyethylene jar, 2000 g of the acidic silica sol 1a (an average primary particle diameter of 12 nm, $SiO_2$ of 25.0% by mass, a pH of 2.8, an average content of the polyvalent metal element M: M/Si molar ratio of 0.0028, the polyvalent metal element M in the surface of the particles of 0.020 atom/$nm^2$, and a zeta potential of −24 mV) obtained in Reference Example 1 was taken. With stirring using a disper at 1000 rpm, 96.0 g of 10% by mass sulfuric acid was added to the sol, and then the whole was stirred for 10 minutes. The obtained silica sol had a pH of 1.2. The sol was left at 23° C. for 24 hours, and then passed through a column filled with 100 mL of a strongly acidic cation-exchange resin in the hydrogen form (Amberlite IR-120B), a column filled with 250 mL of a strongly basic anion-exchange resin in the hydroxy form (Amberlite IR-410), and a column filled with 50 mL of a strongly acidic cation-exchange resin in the hydrogen form (Amberlite IR-120B) in this order over 2 hours to give an acidic silica sol 1A (an average primary particle diameter of 12 nm, $SiO_2$ of 23.0% by mass, a pH of 2.8, an average content of the polyvalent metal element M: M/Si molar ratio of 0.0020, the polyvalent metal element M present in the outermost layer of the colloidal silica particles of less than 0.001 atom/$nm^2$, and a zeta potential of −23 mV).

Example 2

In a 3 L polyethylene jar, 2000 g of the acidic silica sol 2a (a $SiO_2$ concentration of 25.0% by mass, an average primary particle diameter of 22 nm, a pH of 2.5, an average content of the polyvalent metal element M: M/Si molar ratio of 0.0027, the polyvalent metal element M in the surface of the particles of 0.038 atom/$nm^2$, and a zeta potential of −28 mV) obtained in Reference Example 2 was taken. With stirring using a disper at 1000 rpm, 96.0 g of 10% by mass sulfuric acid was added to the sol, and then the whole was stirred for 10 minutes. The obtained silica sol had a pH of 1.2. The sol was left at 23° C. for 24 hours, and then passed through a column filled with 100 mL of a strongly acidic cation-exchange resin in the hydrogen form (Amberlite IR-120B), a column filled with 250 mL of a strongly basic anion-exchange resin in the hydroxy form (Amberlite IR-410), and a column filled with 50 mL of a strongly acidic cation-exchange resin in the hydrogen form (Amberlite IR-120B) in this order over 2 hours to give an acidic silica sol 2A (a $SiO_2$ concentration of 23.0% by mass, an average primary particle diameter of 22 nm, a pH of 2.6, an average content of the polyvalent metal element M: M/Si molar ratio of 0.0019, the polyvalent metal element M present in the outermost layer of the colloidal silica particles of less than 0.001 atom/$nm^2$, and a zeta potential of −28 mV).

Comparative Example 1

An acidic silica sol 1C (an average primary particle diameter of 12 nm, $SiO_2$ of 23.4% by mass, a pH of 2.7, an average content of the polyvalent metal element M: M/Si molar ratio of 0.0020, the polyvalent metal element M present in the outermost layer of the colloidal silica particles of 0.018 atom/$nm^2$, and a zeta potential of −23 mV) was obtained in a similar manner to that in Example 1 except that sulfuric acid was not added.

TABLE 2

|  | Example 1 | Example 2 | Comparative Example 1 |
|---|---|---|---|
| Silica sol | Acidic silica sol 1A | Acidic silica sol 2A | Acidic silica sol 1C |
| Average primary particle diameter (nm) | 12 | 22 | 12 |
| $SiO_2$ (% by mass) | 23.0 | 23.0 | 23.4 |
| pH | 2.8 | 2.6 | 2.7 |
| Zeta potential (mV) | −23 | −28 | −23 |
| M/Si (average content) (molar ratio) | 0.0020 | 0.0019 | 0.0020 |
| Fe/Si | 0.00002 | 0.00002 | 0.00002 |
| Al/Si | 0.00189 | 0.00184 | 0.00188 |
| Ti/Si | 0.00007 | 0.00006 | 0.00007 |
| Zr/Si | 0.00002 | 0.00002 | 0.00002 |
| Zn/Si | <0.00001 | <0.00001 | <0.00001 |
| Pb/Si | <0.00001 | <0.00001 | <0.00001 |
| Sn/Si | <0.00001 | <0.00001 | <0.00001 |
| Polyvalent metal element M in outermost layer of colloidal silica particles (atom/nm$^2$) | <0.001 | <0.001 | 0.018 |
| Fe | <0.0001 | <0.0001 | <0.0001 |
| Al | 0.0002 | 0.0004 | 0.0180 |
| Ti | <0.0001 | <0.0001 | <0.0001 |
| Zr | <0.0001 | <0.0001 | <0.0001 |
| Zn | <0.0001 | <0.0001 | <0.0001 |
| Pb | <0.0001 | <0.0001 | <0.0001 |
| Sn | <0.0001 | <0.0001 | <0.0001 |

Example 3

In a glass reactor having an internal volume of 3 L with a stirrer, a condenser, a thermometer, and two inlets, 2000 g of the acidic silica sol 1A was placed. With the sol in the reactor boiled, methanol steam generated in another boiler was continuously blown into the silica sol in the reactor to replace water with methanol with the liquid level kept almost constant. When the volume of the distillatory solution reached 20 L, the replacement was stopped to give 1840 g of a methanol-dispersed silica sol 1A. The obtained methanol-dispersed silica sol had a $SiO_2$ concentration of 25.0% by mass, methanol of 74.4% by mass, water of 0.6% by mass, a viscosity of 2 mPa·s, and a pH of the sol diluted with the same mass of water of 3.0.

Example 4

In a similar manner to that in Example 3 except that 2000 g of the acidic silica sol 2A was used, 1840 g of a methanol-dispersed silica sol 2A was obtained. The obtained methanol-dispersed silica sol had a $SiO_2$ concentration of 25.0% by mass, methanol of 74.4% by mass, water of 0.6% by mass, a viscosity of 2 mPa·s, and a pH of the sol diluted with the same mass of water of 3.2.

Comparative Example 2

In a similar manner to that in Example 3 except that 2000 g of the acidic silica sol 1a was used, 1840 g of a methanol-dispersed silica sol 1a was obtained. The obtained methanol-dispersed silica sol had a $SiO_2$ concentration of 25.0% by mass, methanol of 74.4% by mass, water of 0.6% by mass, a viscosity of 2 mPa·s, and a pH of the sol diluted with the same mass of water of 3.0.

Comparative Example 3

In a similar manner to that in Example 4 except that 2000 g of the acidic silica sol 2a was used, 1840 g of a methanol-dispersed silica sol 2a was obtained. The obtained methanol-dispersed silica sol had a $SiO_2$ concentration of 25.0% by mass, methanol of 74.4% by mass, water of 0.6% by mass, a viscosity of 2 mPa·s, and a pH of the sol diluted with the same mass of water of 3.2.

Comparative Example 4

In a similar manner to that in Example 4 except that 2000 g of the acidic silica sol 1C was used, 1840 g of a methanol-dispersed silica sol 1C was obtained. The obtained methanol-dispersed silica sol had a $SiO_2$ concentration of 25.0% by mass, methanol of 74.4% by mass, water of 0.6% by mass, a viscosity of 2 mPa·s, and a pH of the sol diluted with the same mass of water of 3.0.

TABLE 3

|  | Example 3 Methanol-dispersed silica sol 1A | Example 4 Methanol-dispersed silica sol 2A | Comparative Example 2 Methanol-dispersed silica sol 1a | Comparative Example 3 Methanol-dispersed silica sol 2a | Comparative Example 4 Methanol-dispersed silica sol 1C |
|---|---|---|---|---|---|
| $SiO_2$ (% by mass) | 25.0 | 25.0 | 25.0 | 25.0 | 25.0 |
| Water (% by mass) | 0.6 | 0.6 | 0.6 | 0.6 | 0.6 |
| pH | 3.0 | 3.2 | 3.0 | 3.2 | 3.0 |

Example 5

In a 500 mL recovery flask, 280 g of the methanol-dispersed silica sol 1A was taken, 7.6 g of phenyltrimethoxysilane was added with stirring on a magnetic stirrer, and the liquid temperature was kept at 55° C. for 2 hours. Then, methyl ethyl ketone was added to the sol under a condition of 500 to 400 Torr and a bath temperature of 70° C. with a rotary evaporator gradually lowering the liquid level to replace the dispersion medium with methyl ethyl ketone. Thus, a clear methyl ethyl ketone-dispersed silica sol 1A ($SiO_2$ of 40.0% by mass, methyl ethyl ketone of 59.7% by mass, methanol of 0.2% by mass, water of 0.1% by mass, and a viscosity of 2 mPa·s) was obtained. When the sol was sealed in a 100 mL narrow mouth glass bottle and kept at 50° C. for a month, the viscosity and the appearance were not changed.

Comparative Example 5

A clear methyl ethyl ketone-dispersed silica sol 1a ($SiO_2$ of 40.0% by mass, methyl ethyl ketone of 59.7% by mass, methanol of 0.2% by mass, water of 0.1% by mass, and a viscosity of 2 mPa·s) was obtained in a similar manner to that in Example 5 except that the methanol-dispersed silica sol 1a was used instead of the methanol-dispersed silica sol 1A. When the sol was sealed in a 100 mL narrow mouth glass bottle and kept at 50° C. for a month, the viscosity was not changed but the appearance turned yellow.

Example 6

In a 500 mL recovery flask, 200 g of the methanol-dispersed silica sol 1A was taken, 7.2 g of methacryloxypropyltrimethoxysilane was added with stirring on a magnetic stirrer, and the liquid temperature was kept at 55° C. for 2 hours. Then, 113 g of tetrahydrofurfuryl acrylate was poured, and methanol and water were removed under a condition of 200 to 40 Torr and a bath temperature of 50° C. with a rotary evaporator to give a clear and colorless tetrahydrofurfuryl acrylate-dispersed silica sol 1A ($SiO_2$ of 30.0% by mass, tetrahydrofurfuryl acrylate of 68.9% by mass, methanol of 1.0% by mass, water of 0.1% by mass, and a viscosity of 12 mPa·s). When the sol was sealed in a 100 mL narrow mouth brown glass bottle and kept at 23° C. for a month, the appearance and the viscosity were not changed.

Comparative Example 6

The operation was carried out in a similar manner to that in Example 6 except that the methanol-dispersed silica sol 1a was used instead of the methanol-dispersed silica sol 1A, but when about 50 g of methanol was removed by evaporation, tetrahydrofurfuryl acrylate was polymerized to be jellified. Thus, a stable tetrahydrofurfuryl acrylate-dispersed silica sol could not be obtained.

Comparative Example 7

The operation was carried out in a similar manner to that in Example 6 except that the methanol-dispersed silica sol 1C was used instead of the methanol-dispersed silica sol 1A, but when about 60 g of methanol was removed by evaporation, tetrahydrofurfuryl acrylate was polymerized to be jellified. Thus, a stable tetrahydrofurfuryl acrylate-dispersed silica sol could not be obtained.

TABLE 4

| | Example 5 Methyl ethyl ketone-dispersed silica sol 1A | Example 6 Tetrahydrofurfuryl acrylate-dispersed silica sol 1A | Comparative Example 5 Methyl ethyl ketone-dispersed silica sol 1a | Comparative Example 6 Tetrahydrofurfuryl acrylate-dispersed silica sol 1a | Comparative Example 7 Tetrahydrofurfuryl acrylate-dispersed silica sol 1C |
|---|---|---|---|---|---|
| $SiO_2$ (% by mass) | 40.0 | 30.0 | 40.0 | — | — |
| Methanol (% by mass) | 0.2 | 1.0 | 0.2 | — | — |
| Water (% by mass) | 0.1 | 0.1 | 0.1 | — | — |
| After storage test  Viscosity | No Change | No Change | No Change | — | — |
| After storage test  Appearance | No Change | No Change | Yellowing | — | — |

Reference Example 3

Preparation of Ester Modified Epoxy Resin

Into a reaction flask with a cooling pipe, a thermometer, and a stirring apparatus, 894.7 g of α-form tris-(2,3-epoxypropyl)-isocyanurate (manufactured by Nissan Chemical Industries, Ltd., an epoxy value of 9.95 eq/kg) and 400 g of toluene were placed and the whole was heated to the reflux temperature to be completely dissolved. Next, 313.3 g of a propionic anhydride solution dissolving 0.38 g of triphenylphosphonium bromide as a reaction catalyst was added dropwise to the reaction system over 60 minutes. After the completion of the dropwise addition, the whole was reacted at the reflux temperature for 2 hours. The reacted solution was concentrated and the epoxy value was ascertained to be 5.65 eq/kg or less (the theoretical value is 5.48 eq/kg), and then toluene was removed by evaporation to give 1208 g of a liquid ester modified epoxy resin. The composition in the obtained liquid ester modified epoxy resin (2) was as follows. When tris-(2,3-epoxypropyl)-isocyanurate was a compound (ii), the compound in which a molecule of propionic anhydride was added to one of the epoxy groups in tris-(2,3-epoxypropyl)-isocyanurate (monoadduct) was a compound (i-1), the compound in which two molecules of propionic anhydride were added to two of the epoxy groups in tris-(2,3-epoxypropyl)-isocyanurate (diadduct) was a compound (i-2), and the compound in which three molecules of propionic anhydride were added to three epoxy groups in tris-(2,3-epoxypropyl)-isocyanurate (triadduct) was a compound (i-3), the (ii):(i-1):(i-2):(i-3) molar ratio was 35%:45%:17%:3% in the epoxy resin (2). The ester modified epoxy resin (2) had a viscosity of 1300 mPa·s at 60° C.

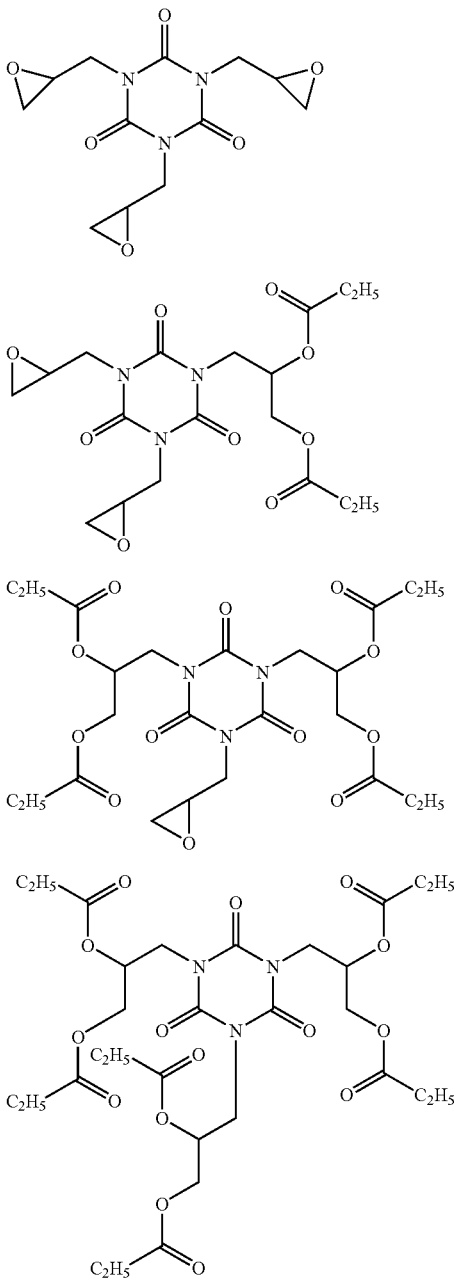

Example 7

Into a recovery flask with an internal volume of 2 L, 1000 g of the methanol-dispersed silica sol 2A was placed, and the solvent was removed by evaporation with a rotary evaporator at 500 Torr and at a bath temperature of 70° C. adding acetonitrile. The solvent was removed by evaporation until the supplied amount of acetonitrile reached 750 g with the liquid level of the sol kept almost constant to give a sol in an acetonitrile-methanol mixed solvent ($SiO_2$ of 26% by mass, acetonitrile of 49% by mass, methanol of 24% by mass, and water of 0.3% by mass). Then, to the obtained sol, 5.0 g of phenyltrimethoxysilane was added with stirring under atmospheric pressure, and the whole was heated at a bath temperature of 65° C. for 5 hours. To the sol, 5.0 g of a 5.0% by mass diazabicycloundecene methanol solution was added and the whole was stirred for 2 hours. Then, the solvent was removed by evaporation with a rotary evaporator at 500 to 350 Torr and at a bath temperature of 70° C. adding acetonitrile. Supplying 1500 g of acetonitrile for keeping the liquid level of the sol almost constant, the solvent was removed by evaporation to give 900 g of an acetonitrile-dispersed silica sol 2A ($SiO_2$ of 28% by mass, acetonitrile of 72% by mass, methanol of less than 0.1% by mass, and water of 0.03% by mass). Into a separable recovery flask with an internal volume of 500 mL, 80 g of the ester modified epoxy resin (2) prepared in Reference Example 3 was placed, and 286 g of the acetonitrile-dispersed silica sol 2A was added and the whole was stirred to make a homogeneous solution. Then, the solvent was removed with a rotary evaporator at 200 to 100 Torr and at a bath temperature of 60° C. to give a clear and colorless ester modified epoxy resin-dispersed silica sol 2A ($SiO_2$ of 47% by mass, ester modified epoxy resin of 47% by mass, acetonitrile of 6% by mass, and a B-type viscosity of 3760 mPa·s at 40° C.).

Comparative Example 8

A clear and colorless ester modified epoxy resin-dispersed silica sol 2a ($SiO_2$ of 46% by mass, ester modified epoxy resin of 46% by mass, acetonitrile of 8% by mass, and a B-type viscosity of 1150 mPa·s at 40° C.) was obtained in a similar manner to that in Example 7 except that the methanol-dispersed silica sol 2a was used instead of the methanol-dispersed silica sol 2A.

Example 8

Into a recovery flask with an internal volume of 2 L, 1000 g of the methanol-dispersed silica sol 2A was placed, and the solvent was removed by evaporation with a rotary evaporator at 500 Torr and at a bath temperature of 70° C. adding acetonitrile. The solvent was removed by evaporation until the supplied amount of acetonitrile reached 750 g with the liquid level of the sol kept almost constant to give a sol in an acetonitrile-methanol mixed solvent ($SiO_2$ of 26% by mass, acetonitrile of 49% by mass, a methanol mass of 24%, and water of 0.3% by mass). Then, to the obtained sol, 5.0 g of phenyltrimethoxysilane was added with stirring under atmospheric pressure, and the whole was heated at a bath temperature of 65° C. for 5 hours. To the sol, 7.5 g of a 5.0% by mass diazabicycloundecene methanol solution was added and the whole was stirred. Then, the solvent was removed by evaporation with a rotary evaporator at 500 to 350 Torr and at a bath temperature of 70° C. adding acetonitrile. Supplying 1500 g of acetonitrile for keeping the liquid level of the sol almost constant, the solvent was removed by evaporation to give 900 g of an acetonitrile-dispersed silica sol 2A ($SiO_2$ of 28% by mass, acetonitrile of 72% by mass, methanol of less than 0.1% by mass, and water of 0.03% by mass). Into a separable recovery flask with an internal volume of 500 mL, 100 g of methylhexahydrophthalic anhydride (the reagent manufactured by TOKYO CHEMICAL INDUSTRY CO., LTD.) was placed, and 153 g of the acetonitrile-dispersed silica sol 2A was added and the whole was stirred to make a homogeneous solution. Then, the solvent was removed with a rotary evaporator at 200 to 40 Torr and at a bath temperature of 60° C. to give a clear and colorless methylhexahydrophthalic anhydride-dispersed silica sol 2A ($SiO_2$ of 39% by mass, methylhexahydrophthalic anhydride of 59% by mass, acetonitrile of 2% by mass, and a B-type viscosity of 120 mPa·s at 30° C.).

Comparative Example 9

A clear and colorless methylhexahydrophthalic anhydride-dispersed silica sol 2a ($SiO_2$ of 29% by mass, methylhexahydrophthalic anhydride of 67% by mass, acetonitrile of 4% by mass, and a B-type viscosity of 310 mPa·s at 30° C.) was obtained in a similar manner to that in Example 8 except that the methanol-dispersed silica sol 2a was used instead of the methanol-dispersed silica sol 2A and the amount of hexahydrophthalic anhydride was changed from 100 g to 117 g.

Example 9

Into a 300 mL four-necked flask, 40.5 g of the ester modified epoxy resin-dispersed silica sol 2A obtained in Example 7 and 15.03 g of methylhexahydrophthalic anhydride were added and then mixed with stirring at 80° C. for 40 minutes. Next, to the mixture, 209 mg of tetrabutylphosphonium O,O'-diethyl dithiophosphate (manufactured by NIPPON CHEMICAL INDUSTRIAL CO., LTD., product name: Hishicolin PX-4ET) dissolved in 2.0 g of methylhexahydrophthalic anhydride was added as a curing accelerator, and then the mixture was degassed under reduced pressure for 2 minutes to give a composition for curing epoxy resin. In the obtained composition for curing epoxy resin, no residual solvent was detected. The obtained composition for curing epoxy resin was poured into a casting plate (a glass plate having a thickness of 3 mm treated with a mold release agent SR-2410 (manufactured by Dow Corning Toray Silicone Co., Ltd.)), and treated with heat under a curing condition of 100° C. for 2 hours and 150° C. for 5 hours to give an epoxy resin cured product. The physical properties of the obtained epoxy resin cured product are shown in Table 5 and Table 6. In Table 5, MeHHPA represents methylhexahydrophthalic anhydride, PX represents tetrabutylphosphonium O,O'-diethyldithiophosphate, PX/MeHHPA represents methylhexahydrophthalic anhydride containing tetrabutylphosphonium O,O'-diethyldithiophosphate, and each mass is shown.

Example 10 and Comparative Examples 10 to 12

Epoxy resin compositions were obtained by a similar operation to that in Example 9. Table 5 shows the blending proportions of the epoxy resin, the epoxy curing agent or the epoxy curing agent-dispersed silica sol, and the curing accelerator. The obtained composition for curing epoxy resin was poured into a casting plate (a glass plate having a thickness of 3 mm treated with a mold release agent SR-2410 (manufactured by Dow Corning Toray Silicone Co., Ltd.)), and treated with heat under a curing condition of 100° C. for 2 hours and 150° C. for 5 hours to give an epoxy resin cured product. In Table 5, MeHHPA represents methylhexahydrophthalic anhydride, PX represents tetrabutylphosphonium O,O'-diethyldithiophosphate, PX/MeHHPA represents methylhexahydrophthalic anhydride containing tetrabutylphosphonium O,O'-diethyldithiophosphate, and each mass is shown.

TABLE 5

| | Epoxy resin | | Epoxy curing agent | | Curing accelerator PX/MeHHPA |
|---|---|---|---|---|---|
| Example 9 | Ester modified epoxy resin-dispersed silica sol 2A | 40.5 g | MeHHPA | 15.03 g | 209 mg/2.0 g |
| Example 10 | Ester modified epoxy resin-dispersed silica sol 2A | 18.08 g | MeHHPA-dispersed silica sol 2A | 13.31 g | 91 mg/1.0 g |
| Comparative Example 10 | Ester modified epoxy resin-dispersed silica sol 2a | 40.4 g | MeHHPA | 15.48 g | 207 mg/2.0 g |
| Comparative Example 11 | Ester modified epoxy resin-dispersed silica sol 2a | 35.84 g | MeHHPA-dispersed silica sol 2a | 17.85 g | 188 mg/2.0 g |
| Comparative Example 12 | Ester modified epoxy resin | 35.34 g | MeHHPA | 29.8 g | 358 mg/2.0 g |

The three-point bending test (flexural strength and flexural modulus), the transmission factor, and the coefficient of linear expansion of each of the epoxy resin cured products obtained in Examples 9 and 10 and Comparative Examples 10 to 12 were measured. The test results are shown in Table 6.

(Measurement of Flexural Properties)

The flexural properties were measured with a tensile tester according to JIS K-6911.

The height and the width of the test piece were measured. The test piece was supported and a load was added to the center of the test piece with a pressurizing wedge. The load was measured when the test piece was broken to calculate the flexural strength (σ). Here, σ represents the flexural strength (MPa) {$kgf/mm^2$}, P represents the load (N) {kgf} when the test piece was broken, L represents the distance (mm) between the supporting points, W represents the width (mm) of the test piece, and h represents the height (mm) of the test piece.

$$\sigma = (3PL)/(2Wh^2)$$

When F/Y represents the slope (N/mm) {kgf/mm} of the straight-line portion in the load-deflection curve, the flexural modulus (E): (MPa) {$kgf/min^2$} is $E = [L^3/(4\,Wh^3)] \times [F/Y]$.

(Measurement of Transmission Factor)

The transmission factor between 200 and 800 nm was measured with a spectrophotometer (Model UV-3600, manufactured by SHIMADZU CORPORATION).

(Measurement of Coefficient of Linear Expansion)

The coefficient of linear expansion was measured according to JIS K-6911. The thickness of a test piece was accurately measured, and the coefficient of linear expansion was measured by TMA (Thermal Mechanical Analysis) with a load of 0.05N and a temperature increase rate of PC/min. The coefficient of linear expansion c was calculated by the equation: change in the length between 30 and 80° C. (ΔL1)/initial length of a test piece (L)×50=$\alpha_1$.

TABLE 6

|  | Three-point bending test (MPa) | | Transmission factor (%) | | Coefficient of linear expansion ppm/° C. | SiO$_2$ content % by mass | Appearance of cured object |
| --- | --- | --- | --- | --- | --- | --- | --- |
|  | Flexural strength | Flexural modulus | 400 nm | 450 nm |  |  |  |
| Example 9 | 124 | 4560 | 80 | 87 | 63 | 34 | Clear and colorless |
| Example 10 | 120 | 6060 | 79 | 87 | 53 | 44 | Clear and colorless |
| Comparative Example 10 | 102 | 4390 | 30 | 56 | 66 | 34 | Yellow |
| Comparative Example 11 | 110 | 5450 | 16 | 45 | 62 | 41 | Thick yellow |
| Comparative Example 12 | 114 | 3300 | 87 | 91 | 69 | 0 | Clear and colorless |

As shown in Examples 9 and 10, when the epoxy resin-dispersed silica sol or the methylhexahydrophthalic anhydride-dispersed silica sol in which the colloidal silica particles of the present invention were dispersed was contained in the epoxy curing composition, the obtained cured product could be filled with the colloidal silica particles at a high filling rate with a high light transmission factor kept.

In contrast, as shown in Comparative Examples 10 and 11, when the colloidal silica particles in which the content of the polyvalent metal element in the surface of the colloidal silica particles was more than 0.003 atom per square nanometer of the surface area of the colloidal particles were used, the epoxy resin-dispersed silica sol and the dicarboxylic anhydride-dispersed silica sol could be obtained, but the epoxy resin cured products using the sols turned yellow, and thus the light transmission factor was reduced. As a result, as compared with the cured object without colloidal silica particles of Comparative Example 12, each of the cured objects of Examples 9 and 10 could have little reduced light transmission factor as well as reduced coefficient of linear expansion and improved flexural strength.

As mentioned above, the epoxy resin-dispersed silica sol and the dicarboxylic anhydride-dispersed silica sol in which the colloidal silica particles of the present invention are dispersed rarely cause the discoloration when an epoxy resin is cured as well as have little light scattering of silica, and thus the colorlessness and transparency of the resin cured product are rarely reduced. Furthermore, filling the silica particles in a resin can improve the thermal properties and the physical properties of a resin cured product. From these reasons, the epoxy resin-dispersed silica sol and the dicarboxylic anhydride-dispersed silica sol in which the colloidal silica particles of the present invention are dispersed are extremely effective when they are used for light-emitting diode (LED) sealers or the like requiring high colorlessness and transparency and heat resistance because the flake and the crack due to the difference in the thermal expansion between the diode and the resin can be prevented.

INDUSTRIAL APPLICABILITY

When the colloidal silica particles of the present invention or the organic solvent-dispersed silica sol, the polymerizable compound-dispersed silica sol, or the dicarboxylic acid-dispersed silica sol each obtained from the colloidal silica particles is used as the reforming agent for resins or the like, decomposition, discoloration, and the like of the resin does not occur but the resin can be reformed, for example, providing hardness and providing heat resistance. They are useful for resin reforming, for example, they are added to a clear resin hard coat film to provide the hardness to the hard coat film, and they are included in a clear resin to improve the flexural strength, the scratch resistance, and the heat resistance.

The invention claimed is:
1. An organic solvent-dispersed silica sol comprising:
colloidal silica particles comprising at least one polyvalent metal element M selected from a group consisting of iron, aluminum, zinc, zirconium, titanium, tin, and lead in an average content of 0.001 to 0.02 in terms of an M/Si molar ratio, and having an average primary particle diameter of 5 to 40 nm, wherein a content of the polyvalent metal element M present in an outermost layer of the colloidal silica particles is 0 to less than 0.001 atom per square nanometer (nm$^2$) of a surface area of the colloidal silica particles; and
an organic solvent;
wherein the colloidal silica particles are non-porous, and the colloidal silica particles being dispersed in the organic solvent.
2. The organic solvent-dispersed silica sol according to claim 1, wherein the organic solvent is at least one solvent selected from a group consisting of alcohols, ethers, ketones, esters, amides, hydrocarbons, and nitriles.

* * * * *